US011467013B2

(12) United States Patent
Ball et al.

(10) Patent No.: US 11,467,013 B2
(45) Date of Patent: Oct. 11, 2022

(54) METHODS OF INSERTING A SENSOR ASSEMBLY INTO A FLOW PIPE UTILIZING A PRELOAD NUT

(71) Applicant: Onicon Incorporated, Largo, FL (US)

(72) Inventors: Eric Ball, Largo, FL (US); Adam Tyler, Largo, FL (US); Kevin Holler, Largo, FL (US); Darral Ying, Largo, FL (US); David Gagliardo, Largo, FL (US); Michael Upham, Largo, FL (US); Adam Sheppard, Largo, FL (US)

(73) Assignee: Onicon Incorporated, Largo, FL (US)

( * ) Notice: Subject to any disclaimer, the term of this patent is extended or adjusted under 35 U.S.C. 154(b) by 123 days.

(21) Appl. No.: 16/924,358

(22) Filed: Jul. 9, 2020

(65) Prior Publication Data
US 2020/0340837 A1  Oct. 29, 2020

Related U.S. Application Data

(62) Division of application No. 16/233,915, filed on Dec. 27, 2018, now Pat. No. 10,724,880.

(60) Provisional application No. 62/611,251, filed on Dec. 28, 2017.

(51) Int. Cl.
*G01F 1/58* (2006.01)
(52) U.S. Cl.
CPC ............. *G01F 1/588* (2013.01); *G01F 1/58* (2013.01)
(58) Field of Classification Search
None
See application file for complete search history.

(56) References Cited

U.S. PATENT DOCUMENTS

| | | | |
|---|---|---|---|
| 4,117,720 A * | 10/1978 | Simonsen | G01F 1/584 73/861.12 |
| 5,303,602 A | 4/1994 | Morgan | |
| 5,355,707 A | 10/1994 | Inoue et al. | |
| 5,410,920 A | 5/1995 | Westwick | |
| 5,529,087 A * | 6/1996 | Berry | F16K 43/00 137/454.6 |
| 5,670,724 A | 9/1997 | Batey | |
| 5,869,770 A | 2/1999 | Yoshimura et al. | |
| 6,286,553 B1 | 9/2001 | Morgan | |
| 6,422,531 B1 | 7/2002 | Sich | |

(Continued)

FOREIGN PATENT DOCUMENTS

| CN | 101 339 060 B | 6/2010 |
|---|---|---|
| CN | 203 132 614 U | 8/2013 |

(Continued)

OTHER PUBLICATIONS

Supplementary European Search Report from corresponding EP Appln. No. 18 89 4480, dated Sep. 22, 2021.

*Primary Examiner* — Harshad R Patel
(74) *Attorney, Agent, or Firm* — Blank Rome LLP

(57) ABSTRACT

Methods of inserting a sensor assembly into a flow pipe are disclosed. The methods may include fastening a preload nut into a hot tap housing, applying force to at least one handle connected to a stem to insert the sensor assembly into the flow pipe, and fastening a collar onto the stem. In one example, the collar is between the preload nut and the hot tap housing. And, in one example, the methods may include tightening the preload nut into the hot tap housing until the preload nut bottoms out at a hard stop.

30 Claims, 29 Drawing Sheets

(56) References Cited

U.S. PATENT DOCUMENTS

| | | |
|---|---|---|
| 6,431,011 B1 | 8/2002 | Feller |
| 6,463,807 B1 | 10/2002 | Feller |
| 6,514,346 B1 | 2/2003 | Nichols |
| 7,571,655 B1 | 8/2009 | Feller |
| 8,136,410 B2 | 3/2012 | Hobbs et al. |
| 8,627,718 B2 | 1/2014 | Ulrich et al. |
| 8,915,453 B1 * | 12/2014 | Sherry .................... C02F 1/048 |
| | | 239/533.1 |
| 2011/0006779 A1 | 1/2011 | Kobayashi et al. |
| 2011/0162459 A1 * | 7/2011 | Hobbs .................... G01F 1/588 |
| | | 73/861.15 |
| 2011/0174394 A1 | 7/2011 | Kristoffersen |
| 2012/0042733 A1 | 2/2012 | Lanham et al. |
| 2013/0006544 A1 | 1/2013 | Rovner |
| 2013/0012779 A1 | 1/2013 | Frassica et al. |
| 2014/0069206 A1 | 3/2014 | Ayers et al. |
| 2015/0090049 A1 | 4/2015 | Kertesz et al. |
| 2015/0211686 A1 | 7/2015 | Dyck |
| 2015/0377666 A1 | 12/2015 | Rovner et al. |
| 2016/0187170 A1 | 6/2016 | Strom et al. |

FOREIGN PATENT DOCUMENTS

| | | |
|---|---|---|
| JP | 2007 147631 A | 6/2007 |
| RU | 14 783 U1 | 8/2000 |
| WO | WO-2017132942 A1 | 8/2017 |

\* cited by examiner

DETAIL 6

DETAIL 11

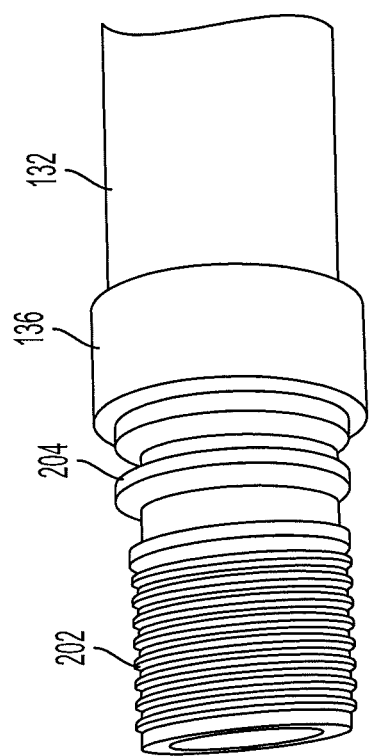
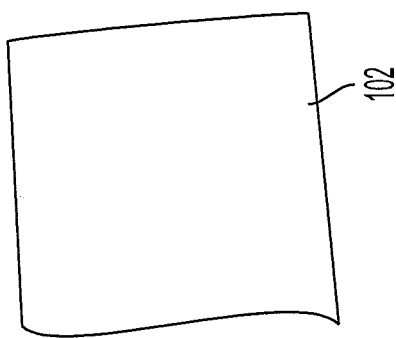
FIG. 14

SECTION XVIII

SECTION XIX

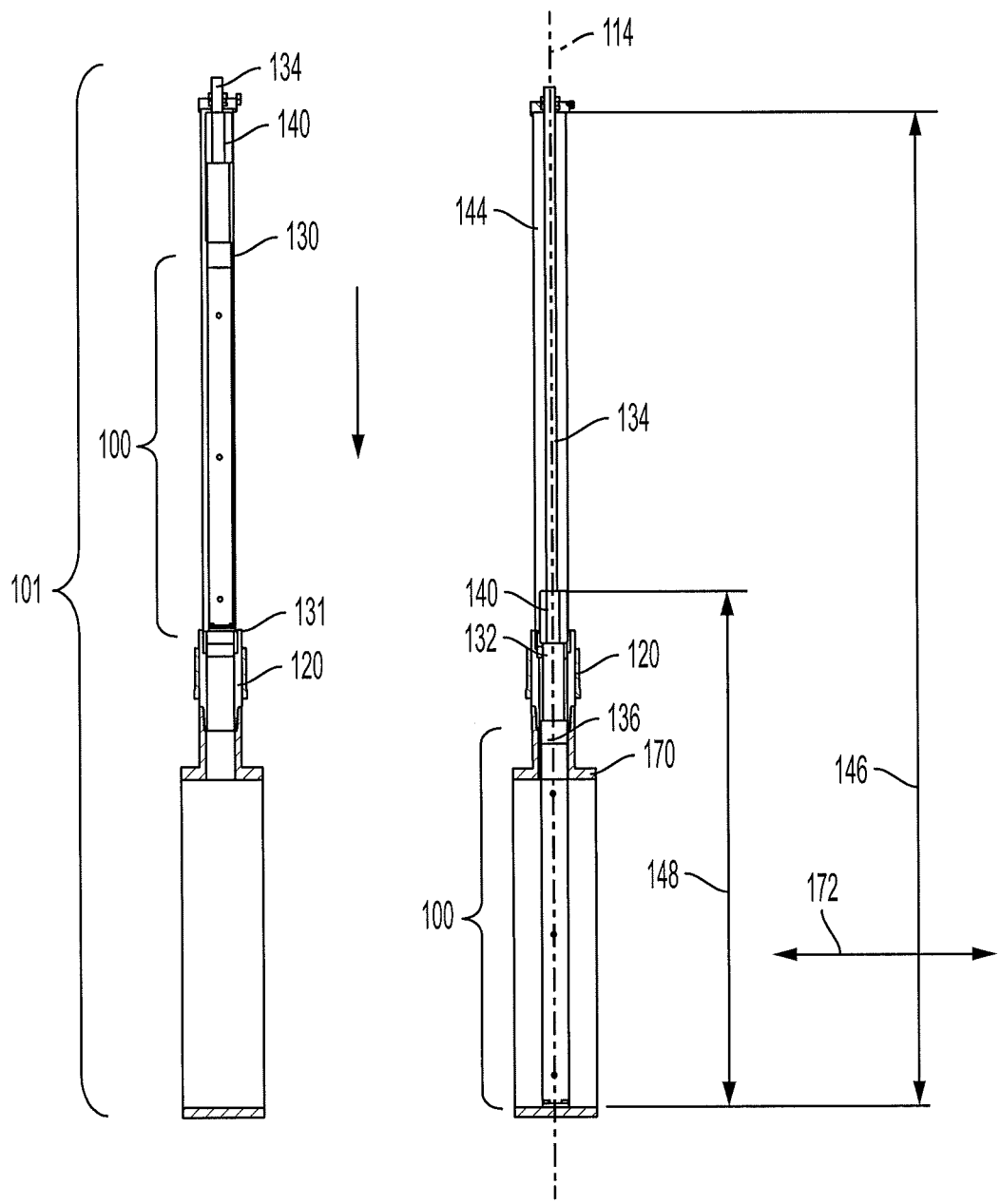

METHODS OF INSERTING A SENSOR ASSEMBLY INTO A FLOW PIPE UTILIZING A PRELOAD NUT

RELATED APPLICATIONS

This application is a divisional of U.S. patent application Ser. No. 16/233,915, filed Dec. 27, 2018, and claims priority to U.S. provisional application 62/611,251, filed on Dec. 28, 2017 the entirety of each which are incorporated by reference herein.

BACKGROUND

The disclosed embodiments generally relate to electromagnetic flow meters.

Current insertion flow meters sample small areas of the flow through a pipe. Even those designed for large pipes simply sample several small sections. They then average these readings in an attempt to get an accurate flow measurement. All averages have some sort of weighting; the most common is to give each reading equal weights. Unfortunately, even if positioned such that each sensor has equal annular area, giving each sensor an equal rating does not lead to accurate measurements if the flow varies from that used to calibrate the meter. Giving unequal weightings can lead to accurate readings, but detailed information about the flow profile is required to give these weights. If the flow changes, the meter will be inaccurate. Separate cores require multiple pre-amps. This makes for a cumbersome and costly meter.

Current insertion flow meters also utilize threaded joints in the body of the meter. Threaded joints are at risk for rotation and backing out after installation. Using a threaded joint as part of an electro-magnetic sensor head is challenging because the sensor must maintain alignment after installation and cannot be allowed to rotate. Snap fits prevent axial movement, but not rotation. They are not strong when bending.

In addition, traditional insertion meters trade off two factors with stem design: insertion force and deflection strength. The smaller the stem, the less force is required to install the meter. A thin stem, however, is subject to unwanted deflection, vibration, fatigue, and breakage.

Further, electrode wires in current insertion meters require shielding from their core's electromagnetic field. Typical cores accomplish this by running the electrode wires up the middle of the core where no field is generated. This can be expensive to machine, difficult to install, and adds complexity to the coil winding.

Insertion flow meters are installed into a flow pipe using hot tap adapters that mount onto a ball valve. Traditional hot tap adapters anchor the meter at the top of the adapter event after installation. This is the furthest point from the force of the flow and the longest moment arm. This causes excessive deflection and vibration which negatively affect meter accuracy.

Hand-insertable hot tappable insertion flow meters often have their alignment decoupled from their installation. That is, the meter can be threaded onto the valve fitting and then aligned afterwards. Mechanically assisted hot tappable flow meters, however, are typically locked into the orientation they are installed in. Threading the meter onto the valve fitting determines the angle of the meter to the flow. This means that the installer must often compromise between the correct installation torque of the fitting and the correct angle of the meter to the flow.

Insertion flow meters' accuracy is also dependent on how consistently they are installed. Any difference in installation angle between where the meter was calibrated and where the meter was installed will worsen the accuracy of the meter.

Current Insertion flow meter controllers must compensate for DC offset on electrodes which may be caused, for example, by electrochemical interaction of the electrodes. This decreases the accuracy of the meters. In addition, other insertion flow meters need to utilize precise timing and switching circuitry to read the signals increasing the overall complexity and cost of the meters.

BRIEF DESCRIPTION OF THE DRAWINGS

FIG. 14 is a schematic view of a sensor head tube and stem in accordance with disclosed embodiments.

FIGS. 20 and 21 show an example sensor assembly in two stages of installation in accordance with disclosed embodiments.

DETAILED DESCRIPTION

Figure 1:
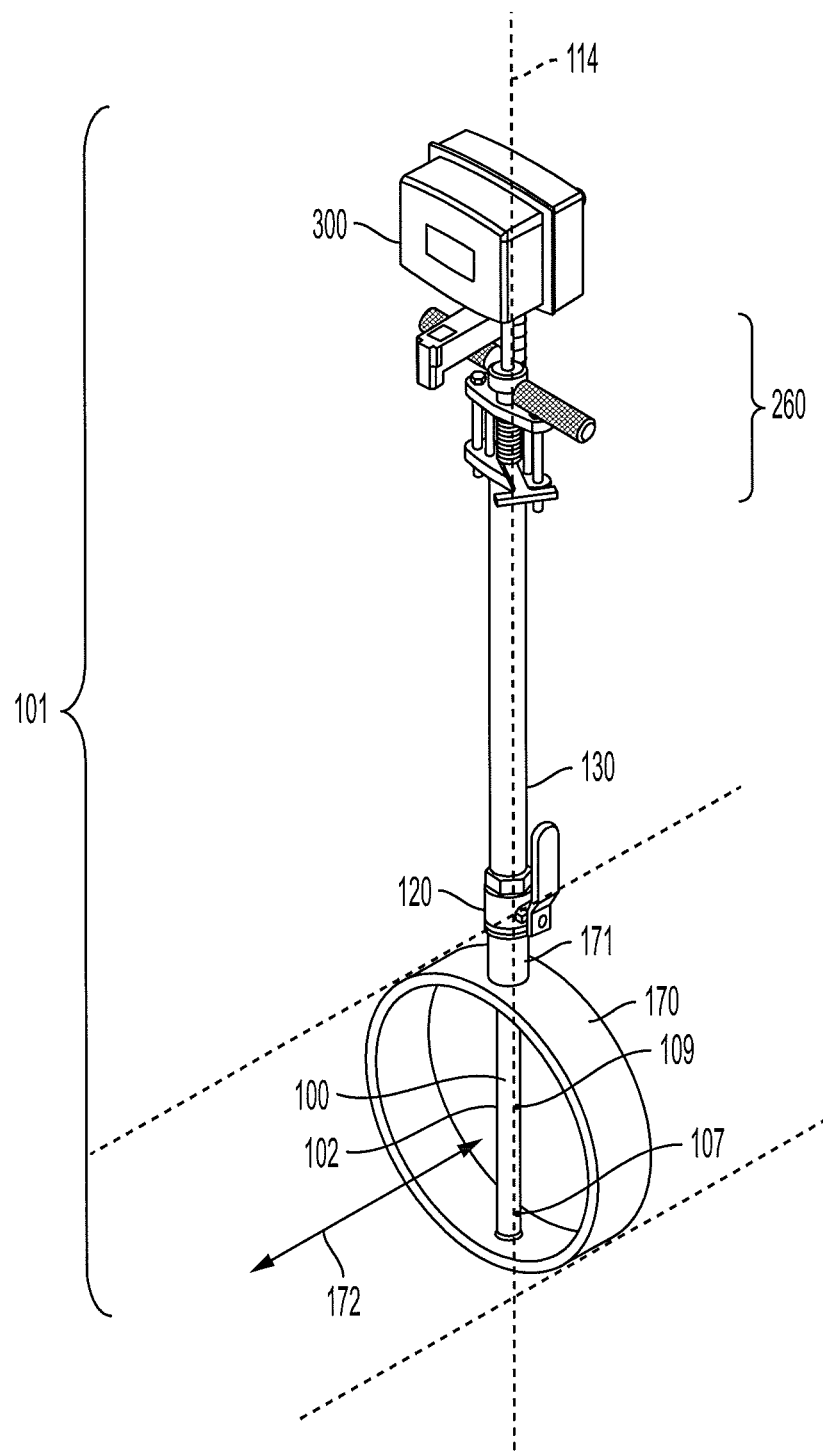
FIG. 1 shows a perspective view of an example sensor assembly in accordance with disclosed embodiments.

FIG. 1 illustrates an overview perspective view of an example sensor assembly 101 installed on and within a flow pipe 170. It should be noted that only a section of flow pipe 170 is shown in full. Other portions of flow pipe 170 are shown in dashed line for clarity. The flow pipe 170 is a section of a system, typically a commercial or industrial system, in which the system flow 172 (either velocity or volumetric or mass flow rate) is desired by the system designer or customer to measured. The flow pipe 170 may be any size diameter pipe. The sensor assembly 101 would be scaled appropriately for the pipe size such that the sensor head 100 and associated components (discussed below) goes across the entire internal diameter of the pipe. Typical uses in industry are generally for pipe diameters between one inch and 24 inches, although disclosed embodiments are equally applicable pipes up to 80 inches and larger. Many industrial and commercial systems utilize 6-12 inch piping which are equally compatible with sensor assembly 101. Example sensor assembly 101 is particularly advantageous for pipe sizes over six inches where prior sensors are more reliant on assumptions of the fluid flow within the pipe.

Example systems include, but are not limited to, chillers, HVAC (heating, ventilation, and air conditioning), food processing, water treatment, water, water distribution, gas, agriculture, chemical refinement and manufacturing, and liquids, slurries, petrochemical, and pharmaceutical systems. For the remaining portion of this specification, we will refer to "fluid" as meaning any fluid or fluid-like material which is capable of inducing a current when flowing through a magnetic field. Sensor assembly 101 may be used with other fluids and systems provided the fluid has enough conductivity to induce a current when flowing through a magnetic field. Most water based fluids include this property. System flow 172 within flow pipe 170 is generally parallel with the pipe and perpendicular with the longitudinal access of the sensor assembly. The relative motion between the system flow 172 and the stationary sensor assembly 101, as described below, creates an electrical signal which is then converted into a flow velocity or volumetric or mass flow rate.

The sensor assembly includes a sensor head 100, which generates a magnetic field and measures the electrical potential (voltage or "V") generated by the flow velocity at least one top electrode and at least one bottom electrode, which will be discussed below. The voltage is carried electrically to the controller 300 which is mounted outside of flow pipe 170. The internal construction and functionality of the sensor head 100 will be discussed in greater detail below.

Affixed to the flow pipe 170, typically at installation of the system, is valve 120. Valve 120 and flow pipe 170 may have a short stub 171 of interceding pipe, which may be part of flow pipe 170 or affixed to it. However, such a stub 171 would only affect the overall length required for the disclosed sensor assembly 101, which is easily scalable depending on the application. As such, the stub will not be discussed further. Valve 120, typically a ball valve, has a sufficient direct path through its center when open to allow the sensor head 100 to be inserted through the valve 120 during installation of the sensor assembly. The valve 120 has an axis 114 in the center of the valve 120 and which is perpendicular to the flow pipe 170 and system flow 172. The accuracy of the sensor head 100 and the resulting flow velocity depends upon the degree to which the longitudinal axis of the sensor head 100 is perpendicular to the system flow 172. And, because sensor head 100 is inserted through valve 120 during installation (discussed below), the longitudinal axis of the sensor head 100, when aligned, should coincide with axis 114. As will be discussed below, the alignment features in the example sensor assembly 101 have improvements over prior known sensors.

Prior to installation, the sensor head 100 is retracted within hot tap adapter 130. At installation, hot tap adapter 130 is connected to valve 120. The hot tap adapter 130 may be detachably connected through, for example, a threaded connection between valve 120 and hot tap adapter 130, or in an alternative, fixedly connected via compression, welding, or the like. The sensor head 100 is affixed to a stem, discussed further below, which extends through hot tap adapter 130 to mechanical insertion device 260, which will also be discussed further below. After the hot tap adapter 130 is connected to valve 120, the valve 120 is opened and the sensor head is inserted into flow pipe 170 until it bottoms out. Further details with respect to installation will be discussed below.

Figure 2:
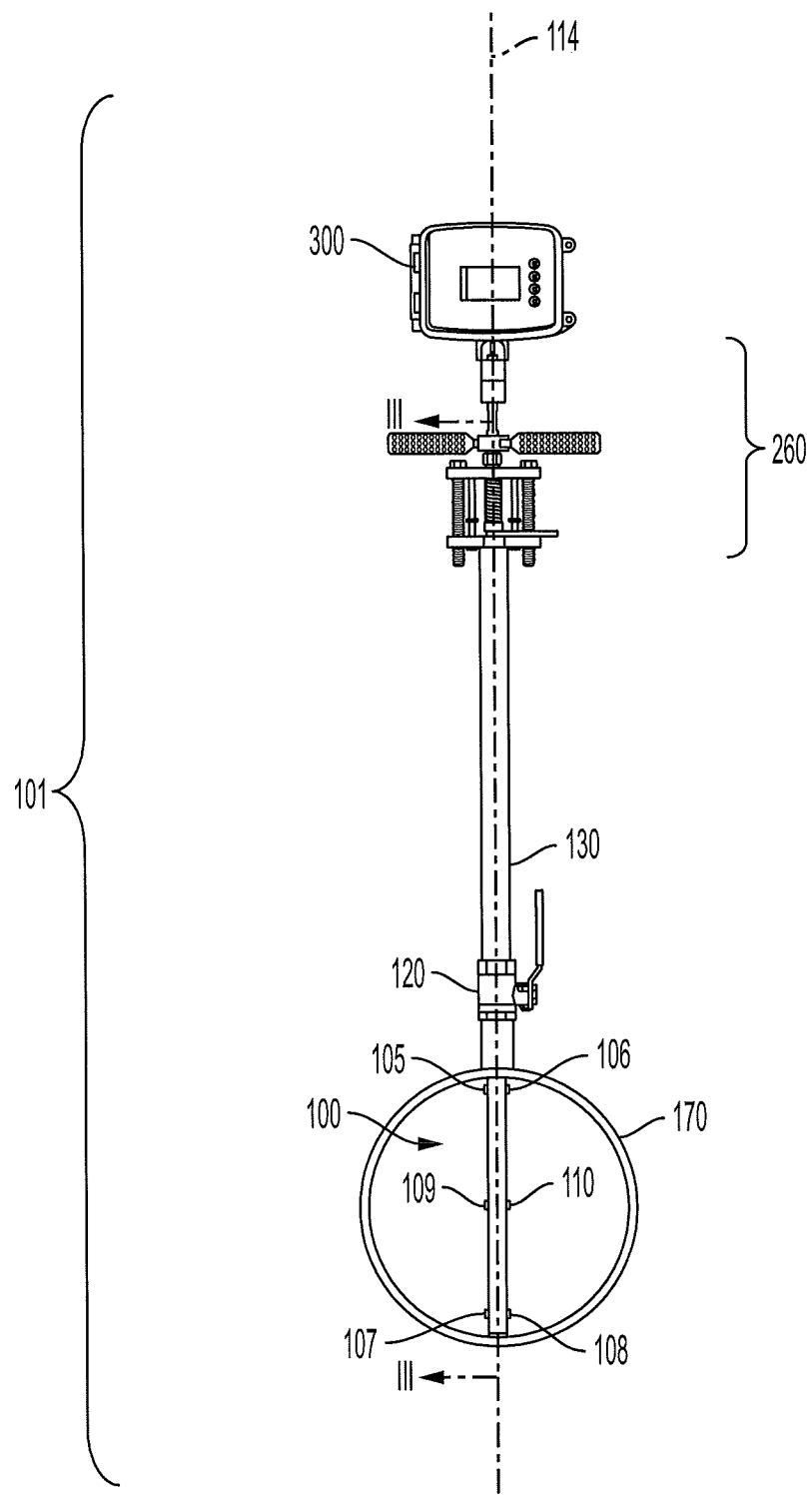
FIG. 2 shows the sensor assembly of FIG. 1 when viewed in the direction of system flow in accordance with disclosed embodiments.

FIG. 2 shows the sensor assembly of FIG. 1 when viewed in the direction of system flow 172. In the top, bottom, and middle regions of the sensor head 100, are holes in which electrodes 105, 106, 107, 108, 109, 110 slightly protrude to make contact with the fluid flow in flow pipe 170. As shown there is a left top electrode 105, a right top electrode 106, a left bottom electrode 107, a right bottom electrode 108, a left center electrode 109, and right center electrode 110. The center electrodes 109, 110 serve as ground or reference electrodes. When taking a flow measurement, an electric potential measurement (voltage) is taken between corresponding top and bottom electrodes. For example, to measure the left portion of the sensor head 100, a voltage measurement is taken across left top electrode 105 and left bottom electrode 107. To measure the right portion of the sensor head, a voltage measurement is taken across right top electrode 106 and right bottom electrode 108. In another configuration, both top electrodes 105,106 and bottom electrodes, 107,108 are electrically connected, respectively, such that a single measurement is taken. i.e., between top and bottom electrodes.

This arrangement of electrodes results in only two depths of measurement, at the top and bottom of the sensor head 100, i.e., respectively proximate or next to the inner surface 173 of flow 170 (at opposing side of the flow pipe 170). It is noted that the top and bottom electrodes 105, 106, 107, 108 span the diameter of the flow pipe 170. That is, the bottom and top electrodes 105, 106, 107, 108 are next to the diametrically opposed inner surfaces 173 of flow pipe 170. Measuring the potential between two depths of measurement across the diameter of the flow pipe 170 results in improved accuracy as compared to measuring multiple sections of the pipe and then averaging the measurements together as done in prior sensors. Extending the distance between the electrodes also increases the voltage potential and boosts meter performance. All of the fluid in the sensing area will be included in the voltage potential integration and will contribute to the meter's reading. The larger the area, the more fluid that is included and the more accurate the meter. Prior known sensors stretch less than 10% of large pipe diameters. Including a large sample area in the example sensor head 100 allows high performance in areas of changing flow profile. While the areas of high and low velocity may shift, because they are all included into a single integration they will still contribute to the overall voltage no matter their location. Because there are only two depths of measurement, the sensor head 100 is easily scalable to any dimension pipe without having to re-adjust electrode spacing and eliminates wired connections between electrodes and signal conditioning circuitry as compared to other sensors which must average together several voltage measurements across the pipe diameter.

Figure 3:
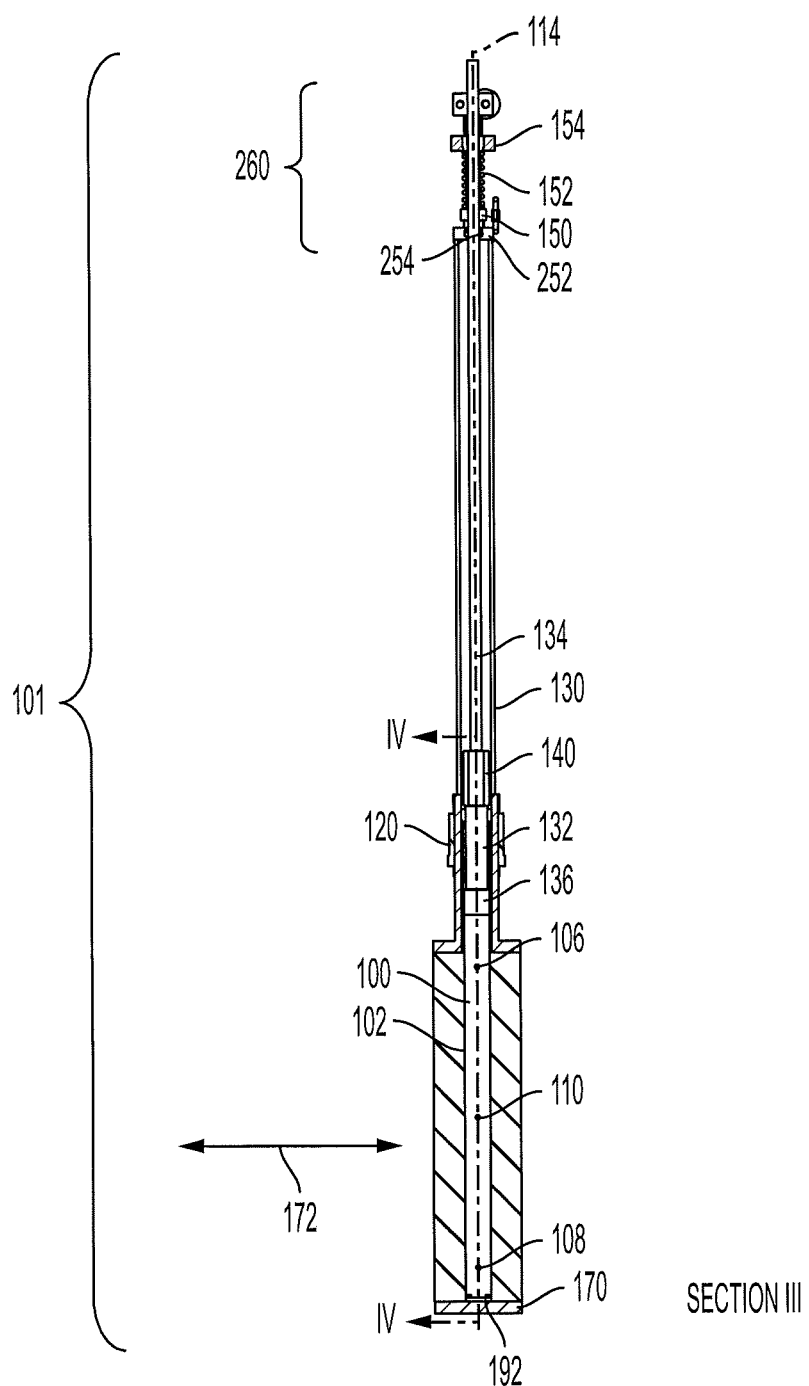
FIG. 3 shows a section view of FIG. 2 along section lines in accordance with disclosed embodiments.

FIG. 3. shows a section view of FIG. 2 along section lines III-III. It is noted that although section lines appears in the center, i.e., along axis 114, it is offset such that the FIG. 3 shows only certain components in section as will be evident from the remaining disclosure. The sensor head 100 is affixed to large diameter stem 132 at the stem cap 136. Large diameter stem transitions to a small diameter stem 134. The stem (including large diameter stem 132 and small diameter stem 134) may be formed as a single piece, or may be formed in several pieces and then joined together using known machining methods. The stem may be formed of, for example, stainless or other types of steel or steel alloys, for example 316 stainless steel. However, any material having sufficient strength for installation and under system operating conditions is suitable. Supporting the large diameter stem 132 and small diameter stem 134 is anchor 140, which will be discussed further below.

The small diameter stem 134 protrudes out of the top of hot tap adapter 130 and through top seal cap 252. Top seal cap 252 seals the system pressure from escaping to atmosphere and seals against small diameter stem 134 with o-ring or seal 254. Top seal cap 252 may be fastened with threads, compression, or welding, or other mechanical means sufficient to withstand system pressures to hot tap adapter 130. Small diameter stem 134 also protrudes through collar 150, spring or springs 152, and upper adjustment plate 154, each of which will be discussed further below. The bottom of the sensor head tube is sealed with bottom seal cap 192.

Figure 4:
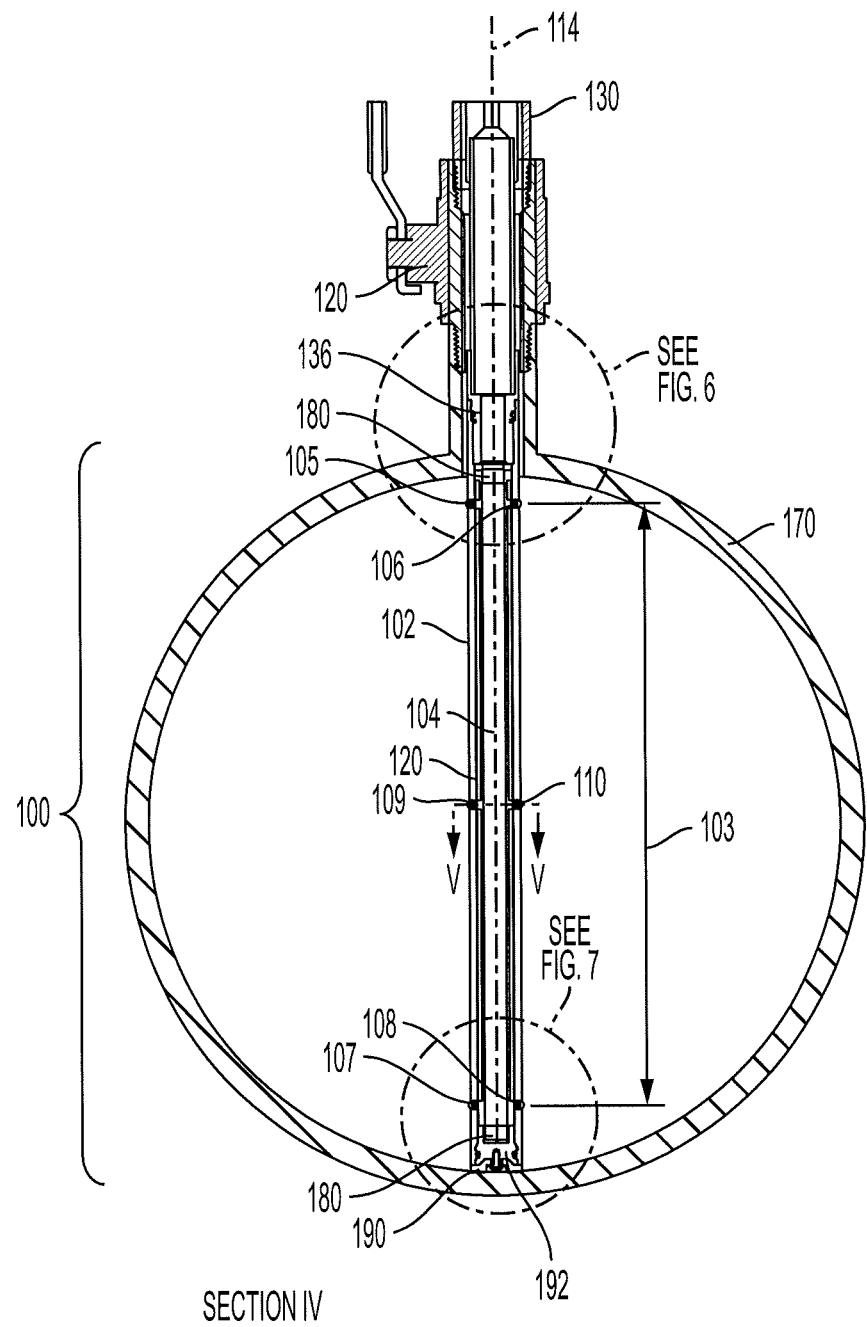
FIG. 4 shows a section view of FIG. 3 along section line IV-IV in accordance with disclosed embodiments.
Figure 28:
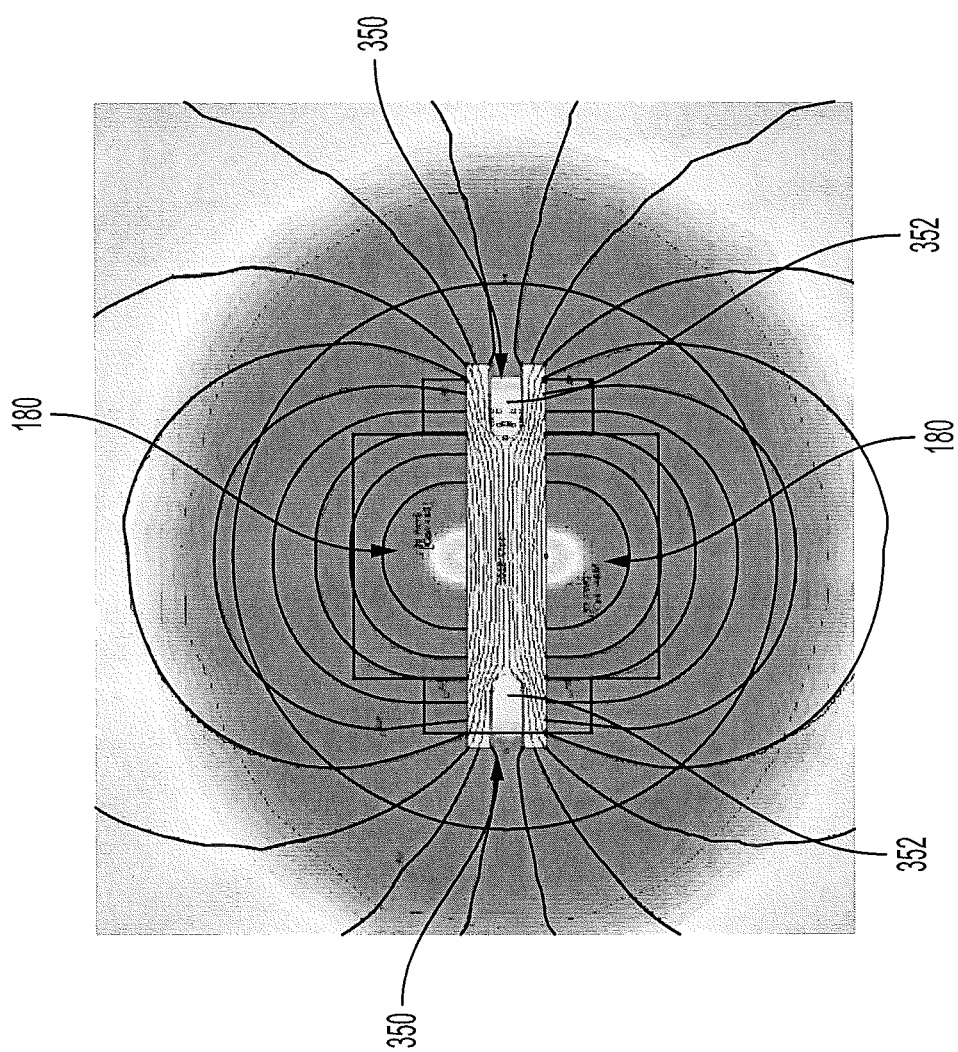
FIG. 28 shows a magnetic field density plot of example coils and an example core in accordance with disclosed embodiments.

FIG. 4 shows a section view of FIG. 3 along section line IV-IV. The sensor head 100 includes one or more field coils 180, for example made of copper wire, wound around a core 104. Other conductive materials may also be used for the field coils 180 which are sufficient to conduct the field coil current. The field coils 180 are wound in-line with the system flow 172 (FIG. 1), that is, the area inside of the field coils is generally parallel with the system flow 172. As shown in FIG. 4, the section of field coils 180 shows wires going into and coming out of the page at the top and bottom of core 104. The field coils 180 and core 104 are within sensor head tube 102, which serves to protect the internal components. Sensor head tube 102 may be made out of any easily machinable material which can withstand system temperatures and pressures including plastic and metal. In one example, sensor head tube includes acetal polymers. Head tube 102 may also be over molded over the coil 180 and electrodes 105, 106, 107, 108, 109, 110. When the field coil 180 is energized with alternating current (AC), an alternating magnetic field is generated (see, for example FIG. 28 showing magnetic field density). The conductive fluid flows through the magnetic field in the direction of system flow 172 (FIG. 1). The conductor (i.e., the conductive fluid) passing through the magnetic field induces an electric potential and current according to Faraday's law, which is indicative of the flow velocity. This voltage is measured between top electrodes 105, 106 and bottom electrodes 107, 108, respectively, to determine the flow rate of the liquid.

Figure 5:
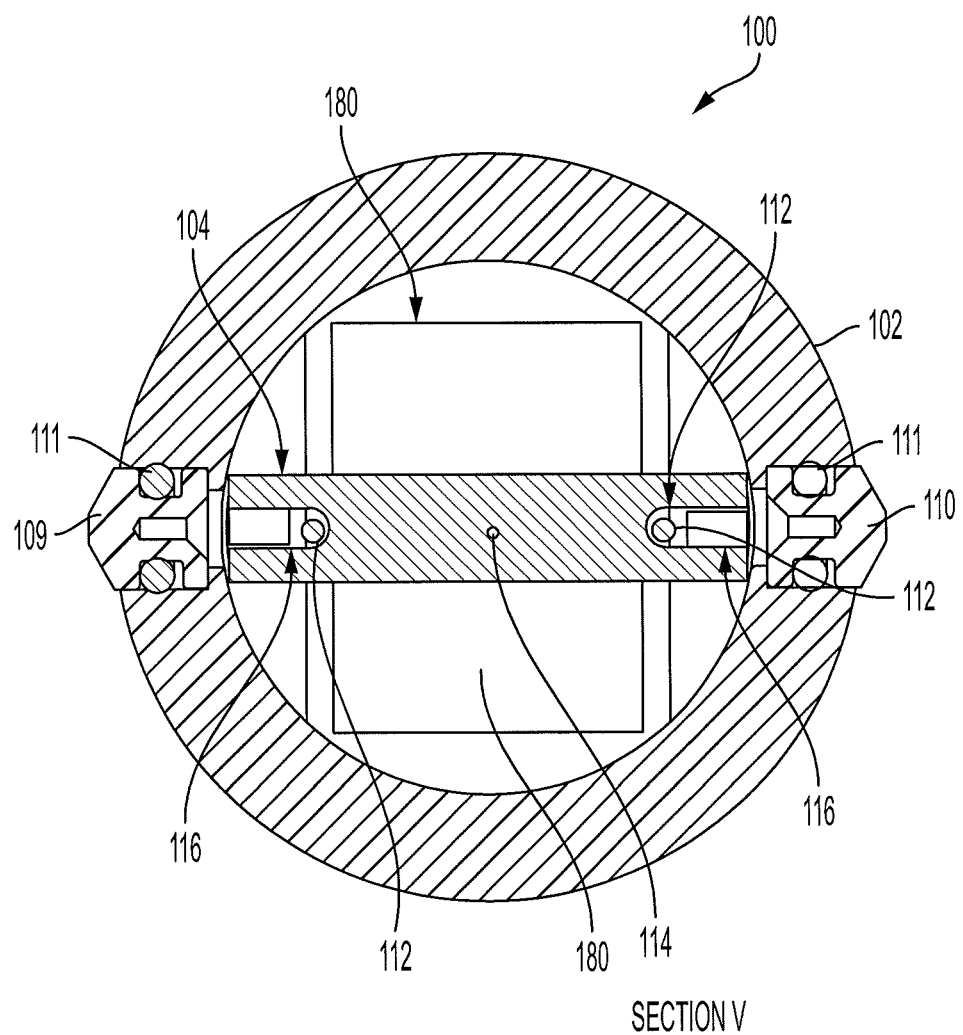
FIG. 5 shows a section view of FIG. 4 along section lines V-V in accordance with disclosed embodiments.

FIG. 5 shows a section view of FIG. 4 along section lines V-V. As shown field coils wrap around and down the longitudinal axis 114 of core 104. Reference electrodes 109, 110 protrude through sensor head tube 102. The sensor head tube 102 may be sealed around electrodes 109, 110 with o-rings/seals 111. The electrodes may be friction fit within holes of sensor head tube 102 or may be secured with a fastener, adhesive, or other known methods. Electrode wires 112 extend from the top of sensor head 100 within sensor head tube 102 to each electrode 109, 110, respectively. It is noted that electrode wires 112 are shown as a single cable for simplicity, however it should be noted that the single cable may include separate insulated conductors within the cable or the cable may be replaced with individual insulated conductors. Top and bottom electrodes 105, 106, 107, 108 are of the same configuration as electrodes 109, 110, may also be sealed with o-rings/seals 111, and also have electrode wires 112. The electrode wires 112 are run in channels 350, discussed below with reference to FIG. 28. The electrode wires 112 may be retained close to the center of the core 104 with a spacer 116. The spacer may be any material having sufficient rigidity to maintain the electrode wires 112 in position. Preferably, the spacer 116 is an insulating material made of plastic such as ABS (acrylonitrile butadiene styrene) or nylon. The electrode wires 112 extend through the spacer 116 and are electrically connected to the electrodes 105, 106, 107, 108, 109, 110 which is not shown for simplicity. The electrode wires 112 may extend through holes in the spacer 116 or through gaps 118 between spacer 116 sections or through formed channels. In another example, the individual wires are replaced with circuit traces on a printed circuit board (PCB), or any other known methods of electrically connecting electrodes, which are placed with channels 350 and/or fastened to the core. The electrode wires 112, as well as electrical connections (not shown) for the field coil 180, extend up through the large diameter stem 132 and small diameter stem 134 to the controller 300 (FIG. 1).

Figure 6:
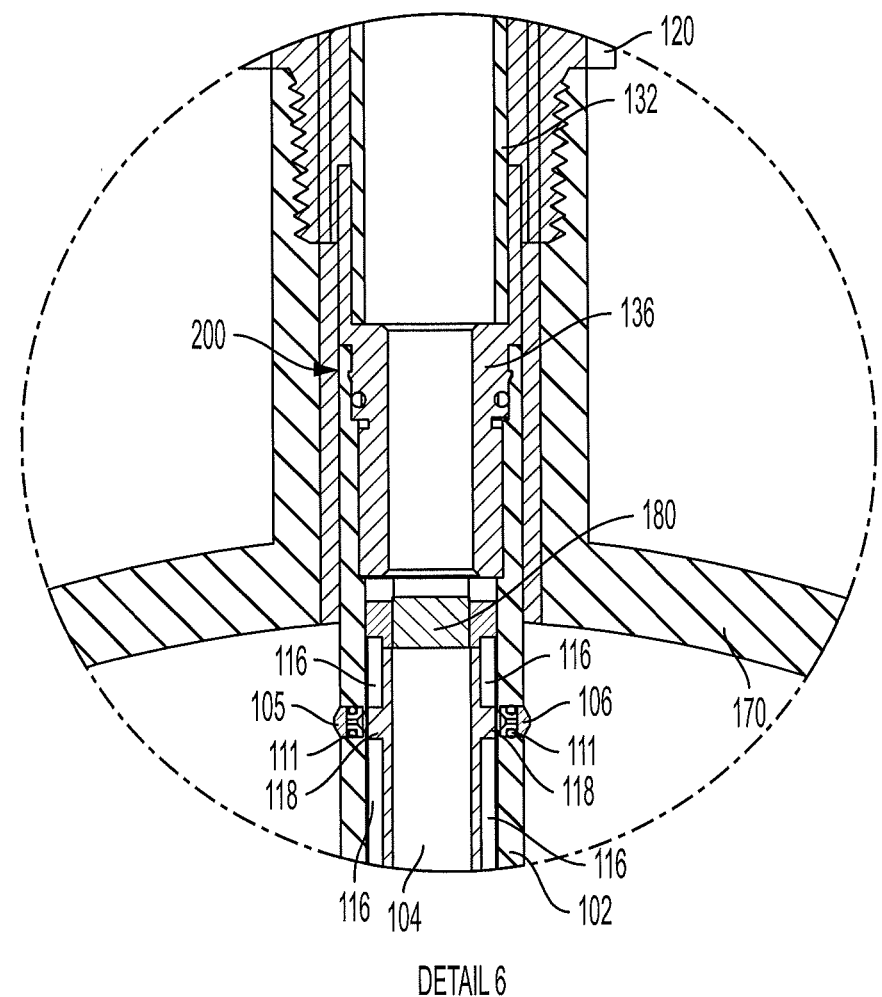
FIG. 6 shows a detailed view of detail 6 of FIG. 4 in accordance with disclosed embodiments.

FIG. 6 shows a detailed view of detail 6 of FIG. 4. Shown in this view is a detailed view of top electrodes 105, 106 o-rings/seals 111, spacers 116, and gaps 118. Also shown is the stem cap 136 attached to the lower portion of large diameter stem 132. The stem cap 136 forms a threaded and snap fit 200 connection with sensor head tube 102, which will be discussed further below.

Figure 7:
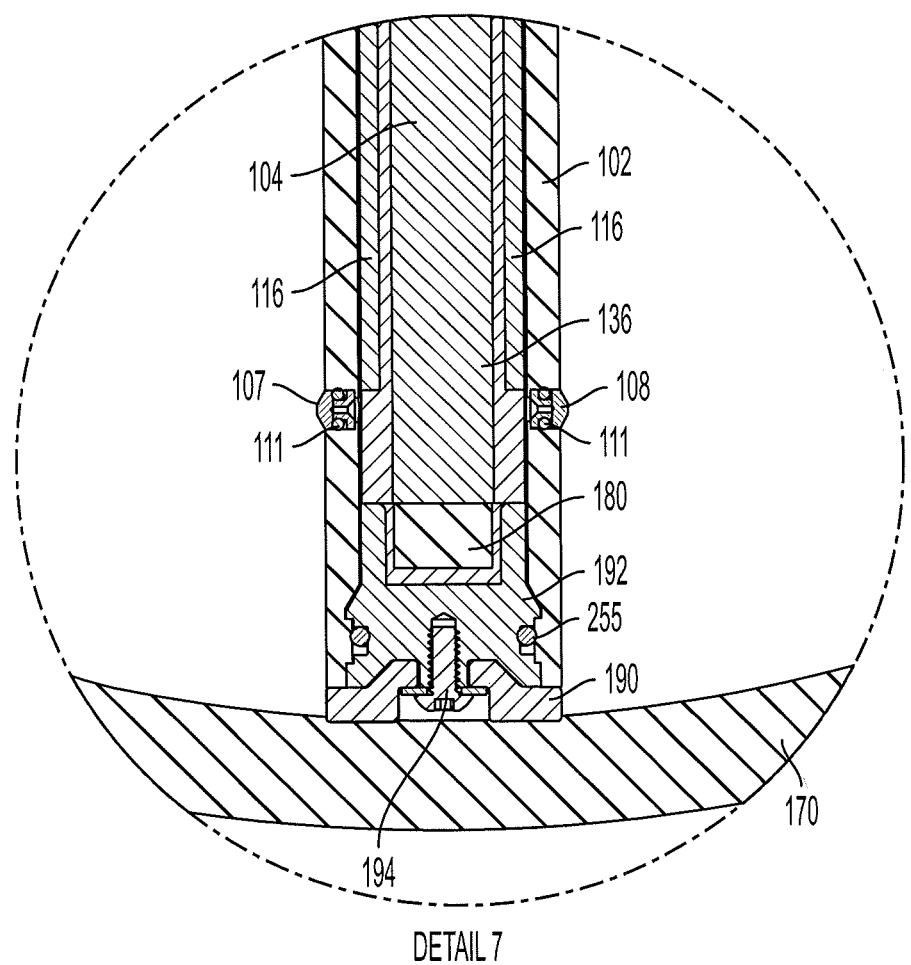
FIG. 7 shows a detailed view of detail 7 of FIG. 4 in accordance with disclosed embodiments.

FIG. 7 shows a detailed view of detail 7 of FIG. 4. The bottom of the sensor head tube 102 is sealed with bottom seal cap 192 and o-ring/seal 255. A resilient foot 190 is on the bottom of bottom seal cap 192, which are fastened together by screw 194. A washer (not shown) may also be included to disperse force. The resilient foot provides a surface of increased friction to better secure the sensor head 100 to the inner surface 173 of the flow pipe 170 (e.g., to prevent rotation) and may also provide protection to the sensor head 100 and flow pipe 170 during installation and adjustment. Also shown are bottom electrodes 107, 108, o-rings/seals 111, and spacers 116.

Figure 8:
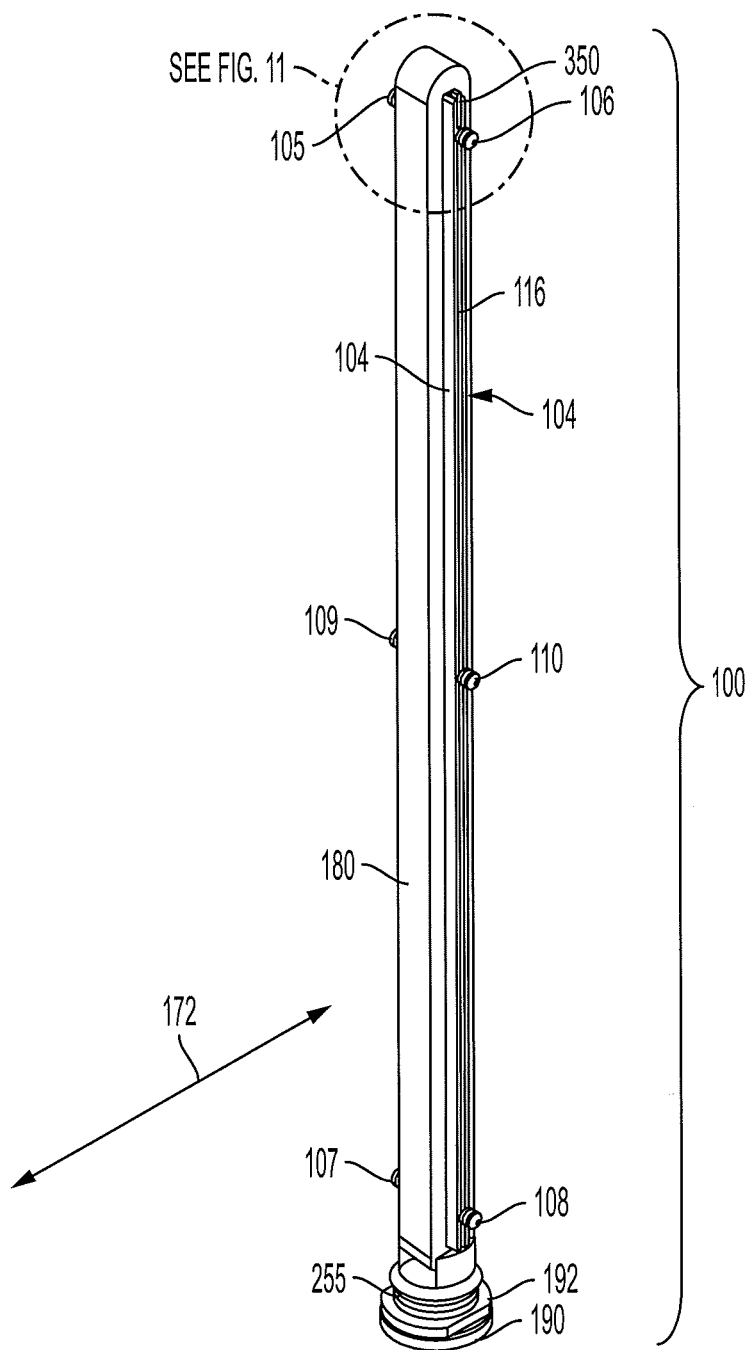
FIG. 8 shows a perspective view of an example sensor head without an example sensor head tube in accordance with disclosed embodiments.
Figure 9:
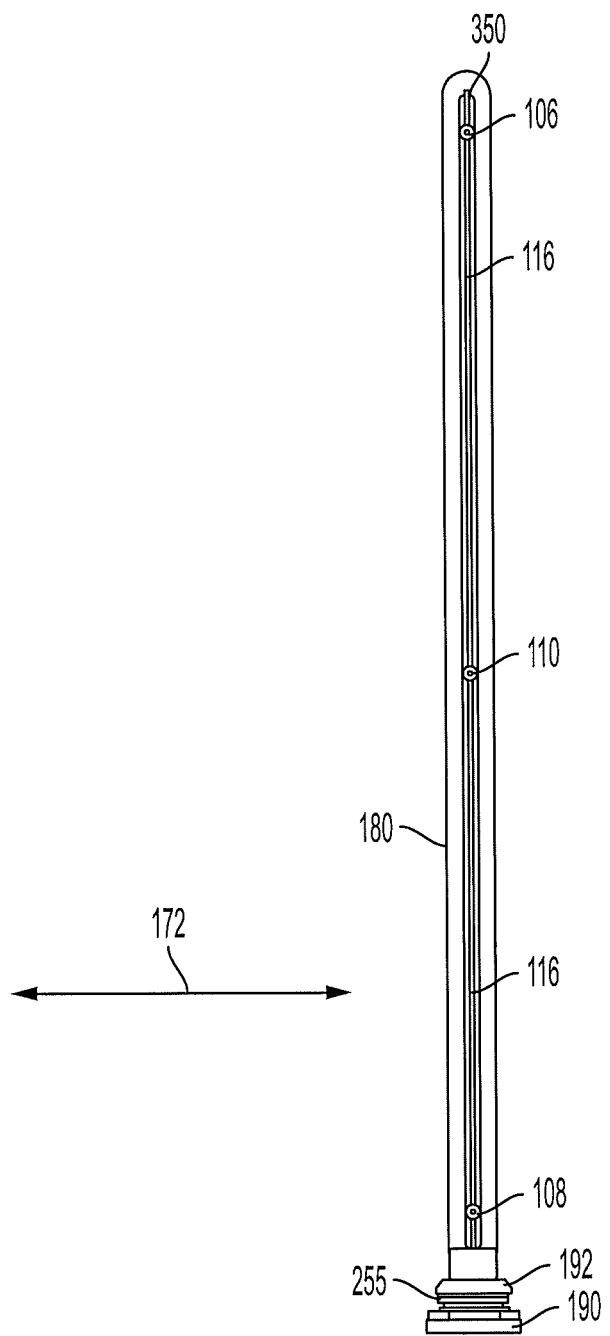
FIG. 9 shows a side view of an example sensor head without an example sensor head tube in accordance with disclosed embodiments.
Figure 10:
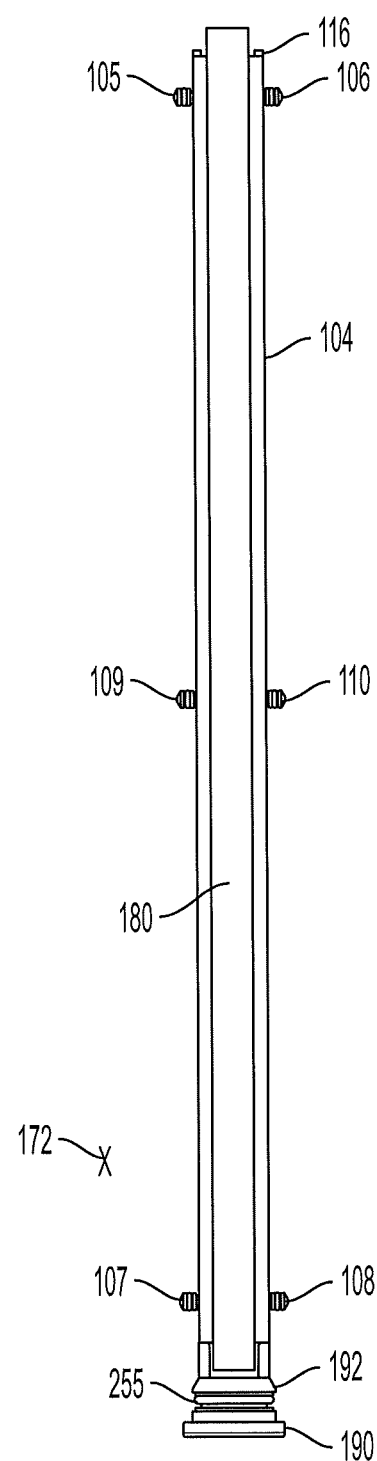
FIG. 10 shows a front view of an example sensor head without an example sensor head tube in accordance with disclosed embodiments.
Figure 11:
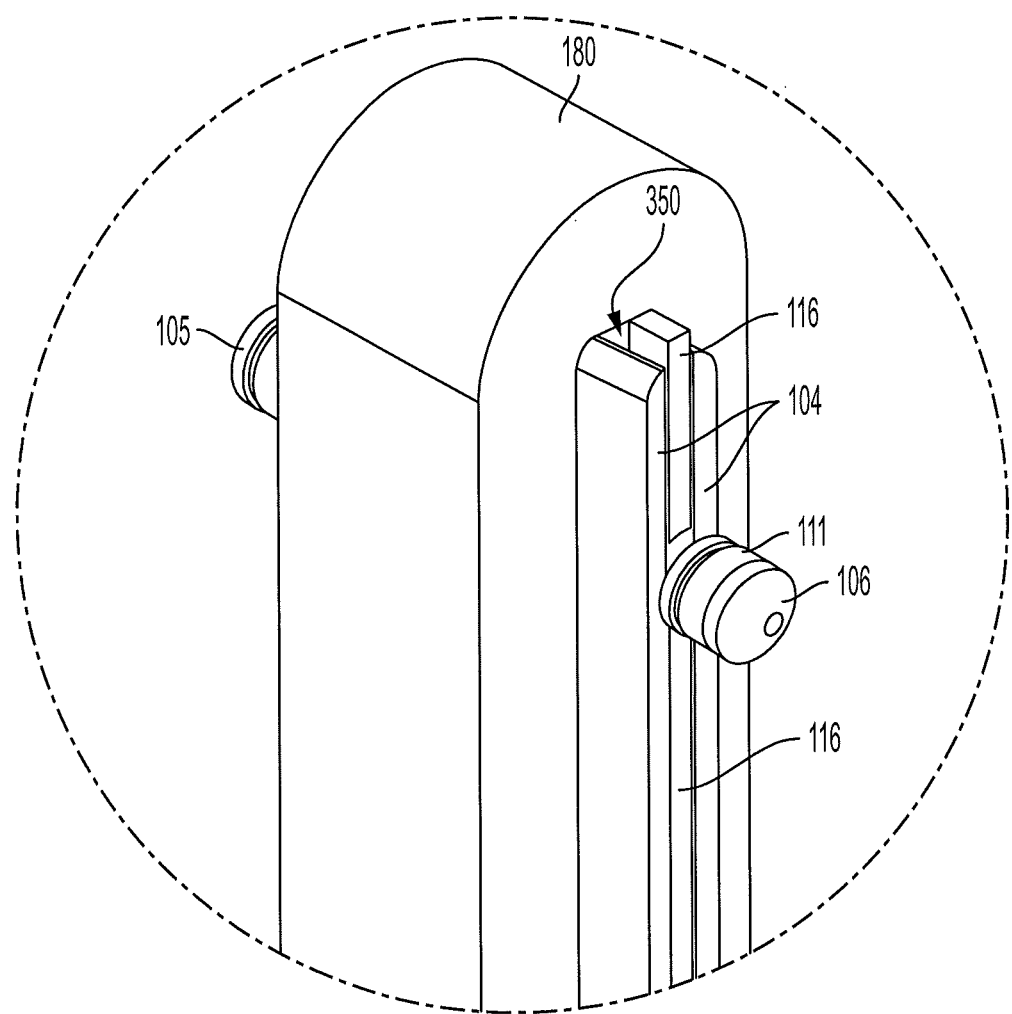
FIG. 11 shows a detail view of detail 11 of FIG. 8 in accordance with disclosed embodiments.

FIGS. 8-10 show perspective, side and front view of sensor head 100 without the sensor head tube 102. FIG. 11 shows a detail view of detail 11 of FIG. 8. The field coils are wound in-line with the system flow 172, while the electrodes 105, 106, 107, 108, 109, 110 protrude perpendicular to system flow 172

Figure 12:
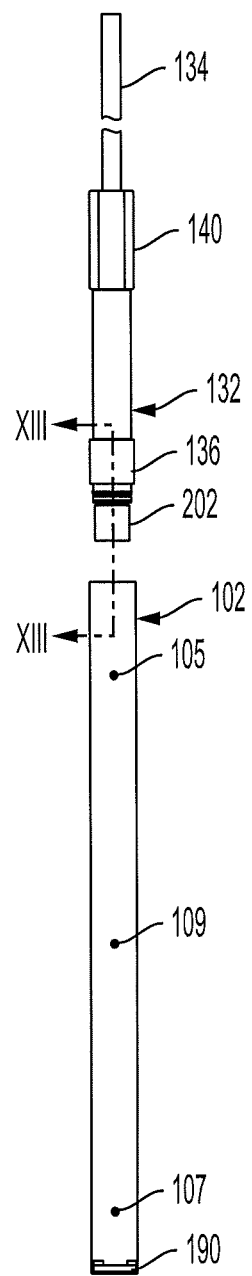
FIG. 12 shows a schematic view of an example sensor head and stem during assembly in accordance with disclosed embodiments.
Figure 13:
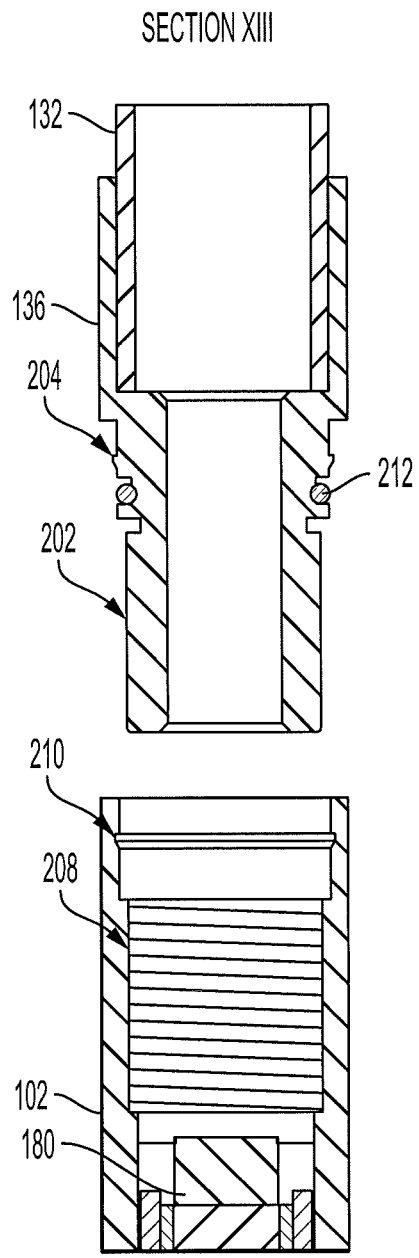
FIG. 13 is a section view along section line XII-XII of FIG. 12 in accordance with disclosed embodiments.
Figure 15:
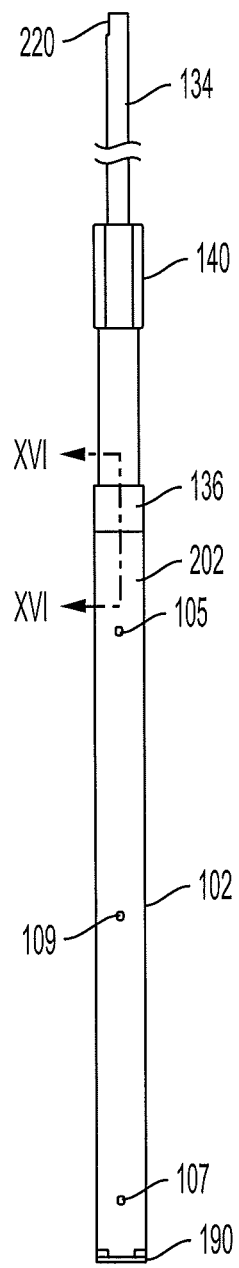
FIG. 15 shows a schematic view of an example sensor head and stem after connecting them together in accordance with disclosed embodiments.
Figure 16:
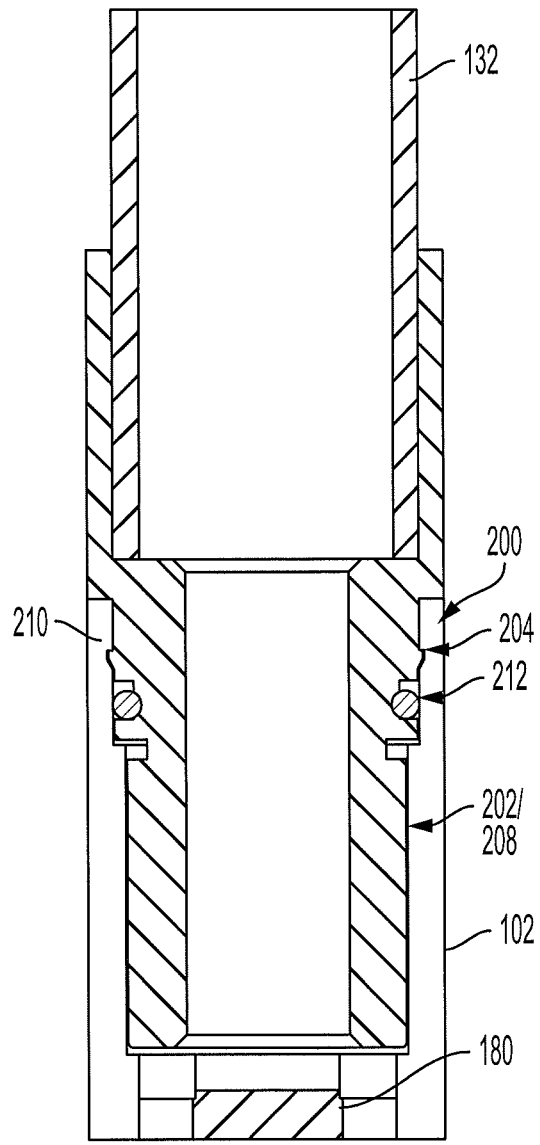
FIG. 16 is a section view along section line XVI-XVI of FIG. 17 in accordance with disclosed embodiments.

Now referring to FIGS. 12-16, the connection between the large diameter stem 132 and sensor head tube 102 will be discussed. FIG. 13 is a section view along section line XIII-XIII of FIG. 12 and FIG. 16 is a section view along section line XVI-XVI of FIG. 15. The end of large diameter stem 132 has both a shaft threaded portion 202, a ledge 204, and an o-ring/seal. It is noted that FIGS. 12-16, and the other figures, show the shaft threaded portion 202 and ledge 204 on a separate mating end or stem cap 136 which is welded or otherwise affixed onto the end of large diameter stem 132. However, in an alternative, the connection features are formed directly on the large diameter stem 132, i.e., there is no separate stem cap 136. For example, the end of large diameter stem 132 can be directly threaded or machined in order to provide the shaft threaded portion 202 and ledge 204.

On the internal wall of sensor head tube 102, a head tube threaded portion 208 is formed which matches the thread of shaft threaded portion 202. In between the head tube threaded portion 208 and the connecting end of sensor head tube 102, a lip 210 is formed. The lip 210 is sized such that sensor head tube 102 and lip 210 can deform sufficient enough to be pressed over ledge 204 when fastening the large diameter stem 132 and sensor head tube 102 together by hand and resulting in a snap-fit 200 (FIG. 16). The snap-fit may be improved with o-ring 212. Notably, the junction includes both threads and snap-fit such that the threads, when the junction is being twisted assists in pressing the lip 210 over ledge 204. It should be noted that although embodiments are shown with a snap-fit feature, other embodiments may not include a snap-fit feature.

Threaded joints are at risk for rotation and backing out after installation. Using a threaded joint alone as part of an electro-magnetic sensor head is challenging because the sensor must maintain alignment after installation. Rotation after installation reduces accuracy and can lead to inadvertent disassembly. Snap fits prevent axial movement, but not rotation. They are also weaker in bending. Combining a snap fit with a threaded feature allows the meter to be assembled by hand instead of using a press; the joint must simply be rotated and the pieces will pull themselves together. It also prevents deflection and adds to the amount of torque required to remove the stem helping to prevent inadvertent disassembly. However, as noted, the snap-fit feature is not required to prevent disassembly or to prevent rotation.

The threaded feature combined with the snap-fit feature locks the sensor head 100 to the large diameter stem 132 by preventing backing out (i.e. reverse rotation). The threaded feature (shaft threaded portion 202 and head tube threaded portion 208) pulls the sensor head 100 onto the stem cap (132 large diameter stem). As the parts are pulled together, a snap fit 200 feature is engaged. Once the snap fit 200 has engaged, the sensor head 100 cannot easily be disassembled. Because the threads force rotational movement to also have axial movement, once the axial movement is locked down the sensor head 100 cannot rotate without additional torque. This prevents the joint from backing out and separating when in service, and also prevents rotation and misalignment of the sensor head 100 to the stem. Once the snap fit 200 is made, a flat 220 or other mechanical key can be added to the top of small diameter stem 134 aligned with electrodes 105, 107, 109 so that the rotational orientation of the sensor assembly 101 is known after insertion into the flow pipe 170.

While the threaded joint alone has advantages over a snap fit joint, such as reduced bending and spreading the load over more area, by combining the threaded feature with the snap fit joint, a stiffer design and a stronger sensor head is achieved overall. Snap features and threaded features can both, in one example, be produced on a lathe. This reduces machining costs by eliminating the need for a mill like other anti-rotation features.

Figure 17:
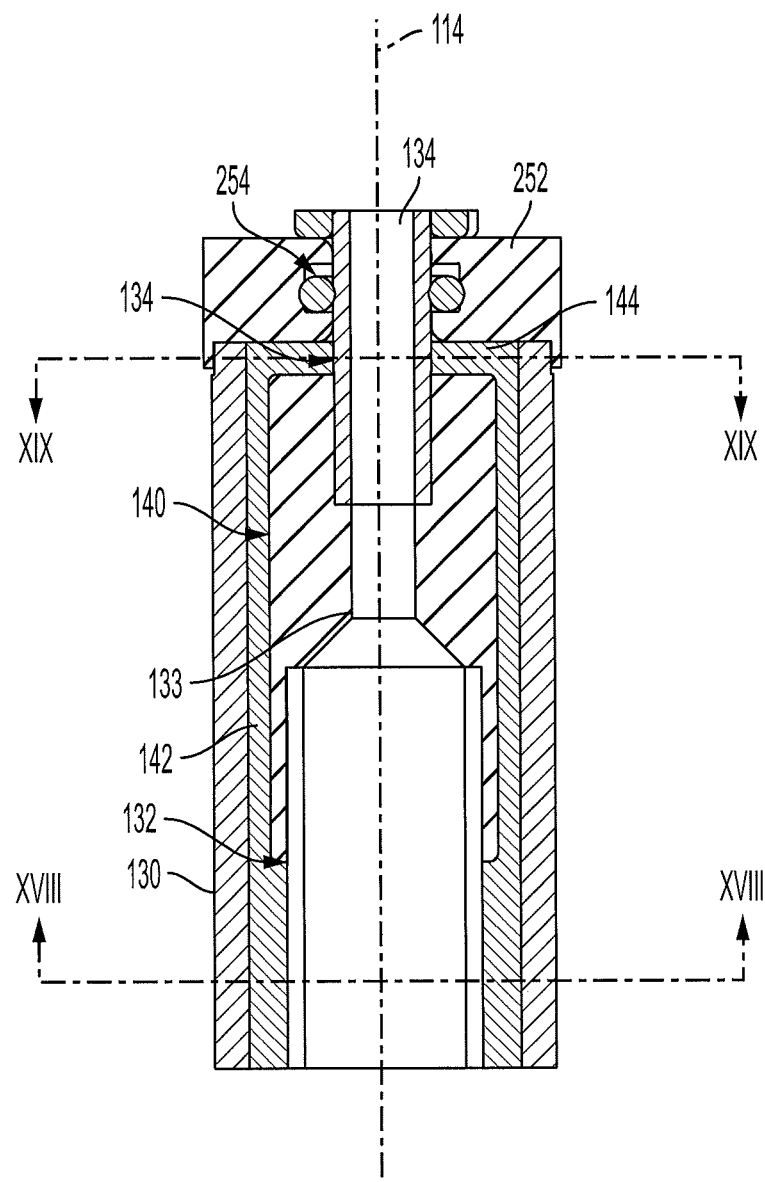
FIG. 17 is a schematic view of an example anchor prior to insertion of an example sensor head in accordance with disclosed embodiments.

FIG. 17 shows a view of anchor 140, large diameter stem 132, and small diameter stem 134 in an uninstalled position within hot tap adapter 130. Large diameter stem 132 transitions to a small diameter stem 134 at stem transition 133. Stem transition 133 is shown as tapered from large diameter stem 132 to small diameter stem 134. However other transitions having sufficient strength may also be used. The anchor 140 is affixed to both large diameter stem 132, and small diameter stem 134. The anchor 140 is of sufficient diameter to fit snuggly within hot tap adapter 130. However, the anchor, in one example, includes one or more holes within the anchor or gaps 142 around the anchor between it and the hot tap adapter 130 in order to equalize the pressure from the system flow 172 to upper region 144. Gaps 142 are advantageous, in one example, because if system flow 172 pressure is not equalized to upper region 144, the entire system pressure must be overcome in order to insert the stem. However, if system pressure is allowed to equalize, less force is required. The gap 142 should be sized appropriately to allow pressure equalization during a standard installation maintenance availability. Gaps sizes may vary depending on system design pressure. For example, a larger gap may be required for higher pressure systems for the same equalization time. As shown, the gaps 142 area total from about 0.180 in$^2$ to about 0.136 in$^2$, which is about 16% of the total inside cross sectional area of the example hot tap adapter 130. The anchor 140 may include friction reducing pieces, coatings, or inserts to reduce the sliding friction of anchor 140 against the inner wall of the hot tap adapter 130. For example, in an alternative embodiment, the anchor may include Delrin® or acetal plastic sliders. However, other friction reducing coatings which do not contaminate the system may also be used. Hot tap adapter 130 and upper region 144 are sealed from the atmosphere by top seal cap 252 having o-ring/seal 254.

Figure 18:
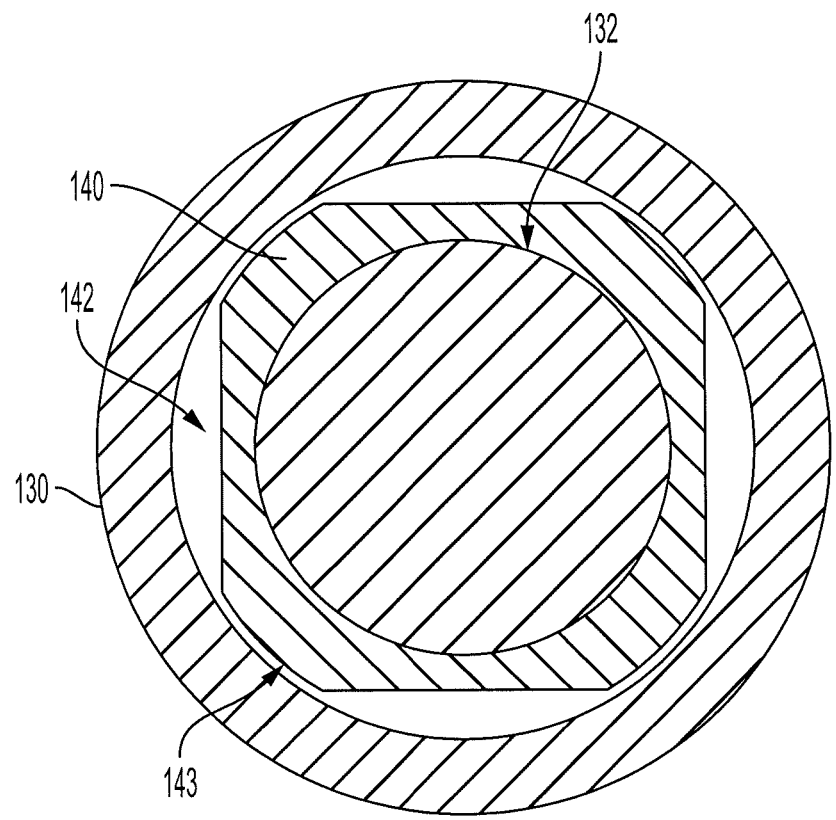
FIG. 18 is a section view along section line XVIII-XVIII of FIG. 17 in accordance with disclosed embodiments.

FIG. 18 is a section view along section line XVIII-XVIII of FIG. 17. Shown is large diameter stem 132 and anchor 140. The anchor 140 has a generally square profile with rounded corners 143. The rounded corners 143 ensure a tight fit with little room for lateral displacement, the importance of which will be discussed below. Although a space is shown at rounded corners 143 between anchor 140 and hot tap adapter 130, there is ideally no gap. However, due to tolerance in machining, the gap is about 0.0015 inches to allow for insertion. Gaps 142 are provided to allow for pressure equalization.

Figure 19:
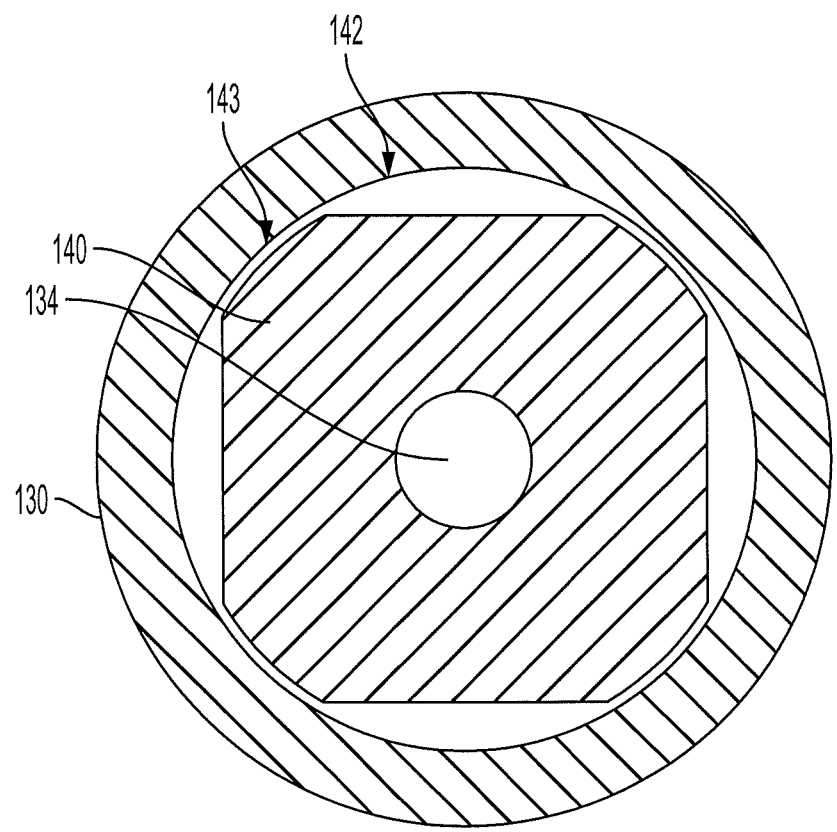
FIG. 19 is a section view along section line XIX-XIX of FIG. 19 in accordance with disclosed embodiments.

FIG. 19 is a section view along section line XIX-XIX of FIG. 17. Shown is small diameter stem 134 and anchor 140. FIG. 19 illustrates the hydraulic mechanical advantage obtained by using an installation force against small diameter stem 134 which is being opposed by system pressure on the anchor 140 and large diameter stem 132. Each of anchor 140 and large diameter stem 132 have a larger surface area than small diameter stem 134, that is the anchor 140 has a larger cross-sectional surface area than the small diameter stem 134 across each of their respective longitudinal axis. Due to the change in area from the small diameter stem 134, where the installation force is applied, to the anchor 140 and large diameter stem 132, an increase in mechanical advantage is achieved according to Pascal's law (or Pascal's principal). This mechanical advantage reduces the force required to insert the sensor head tube and thus, also reduces the complexity and expense of the insertion mechanism, discussed further below. Traditional insertion sensors (hot tap sensors) trade off two factors with stem design: insertion force and deflection strength. The smaller the stem, the less force is required to install the sensor. A thin stem, however, is subject to unwanted deflection, vibration, fatigue, and breakage. Example disclosed embodiments, however, allow the high strength (and small deflection) of a large stem together with the low insertion force of a small stem.

FIGS. 20 and 21 show an example sensor assembly in two stages of installation. First, with the valve 120 closed, the end of hot tap adapter is connected to valve 120 at junction 131. Junction 131 may be any known mechanical means to join pipe sufficient to withstand the pressure and mechanical stresses at the junction, including but not limited to a threaded connection. Then, valve 120 is opened and the system pressure is equalized across anchor 140 as discussed with reference to FIGS. 17-18. Before, after, or during pressure equalization, the rotational orientation is initially checked and adjusted by rotating small diameter stem 134, which will be discussed further below. After equalization, the small diameter stem 134 is pushed towards flow pipe 170, which pushes the anchor 140, large diameter stem 132 and sensor head 100 into flow pipe 170. Rotational orientation may be further verified and adjusted following insertion.

In prior art hot tap sensors, the stem has a fixed diameter which is either less than the inner diameter of its associated hot tap adapter. That is, it does not fit snugly within its hot tap adapter allowing for mechanical deflection. Or the stem has a large diameter the length of the hot tap adapter. In a small adapter configuration, the entire force of system flow 172 acts perpendicular to valve axis 114 is transferred the entire length 146 of the shaft to the top seal cap and results in a large moment arm, which increases the torque on the stem and top seal cap. These prior small stem configurations result not only in undue stresses to the stem and top seal cap, but also result in a higher likelihood of measurement inaccuracy due to the deflection of the sensor. In the example sensor assembly 101 of the current application anchor 140 fits snugly with the inner diameter of hot tap adapter 130. The anchor 140 is inserted during installation with large diameter stem 132 towards flow pipe 170 causing the anchor point or moment arm to dynamically shift towards the bottom of flow pipe 170. Anchor 140 has an inserted position closer to pipe 170 than in prior sensors. The anchor 140 acts as the fulcrum for the now decreased moment arm 148 as compared to prior sensors, which reduces the mechanical deflection of the sensor head 100. In addition, as discussed above, the example sensor assembly also has decreased insertion force as compared to fixed large stem configurations.

Figure 22:
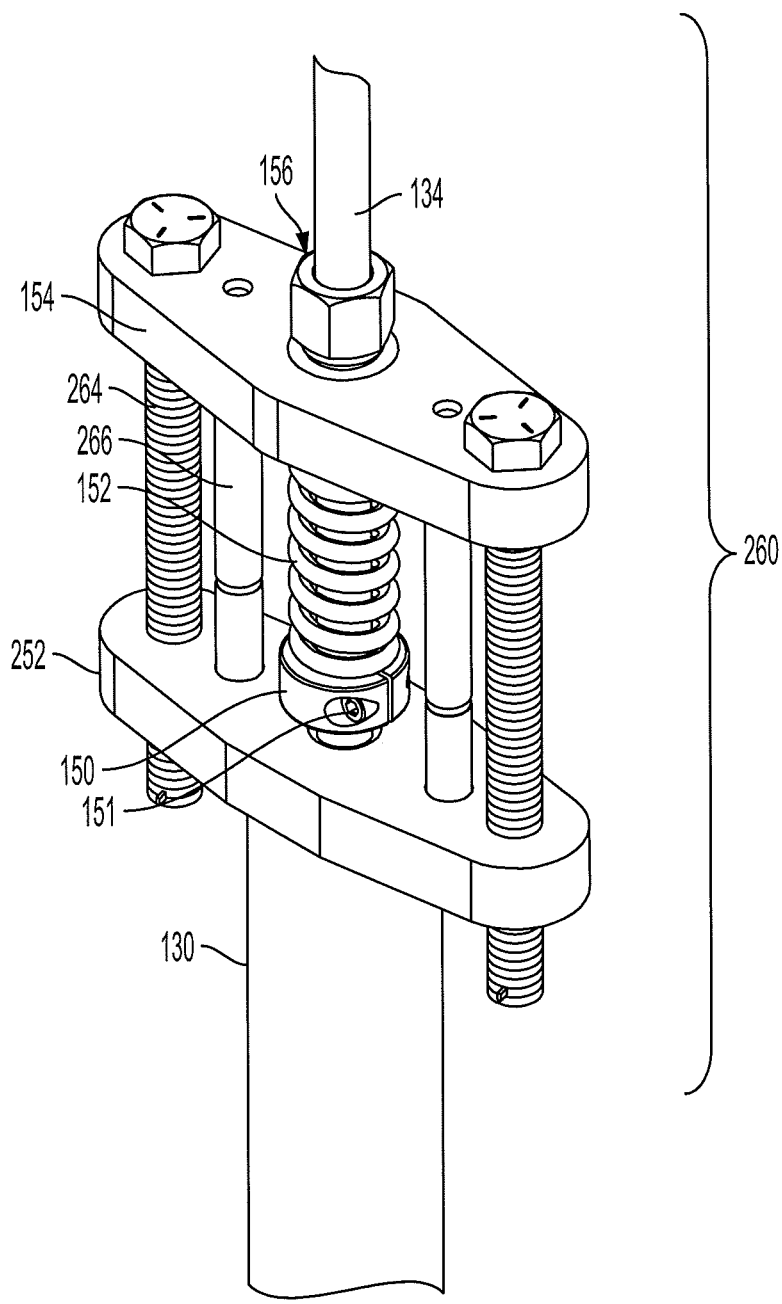
FIG. 22 shows a perspective view of an example mechanical insertion device 260 in accordance with disclosed embodiments.
Figure 23:
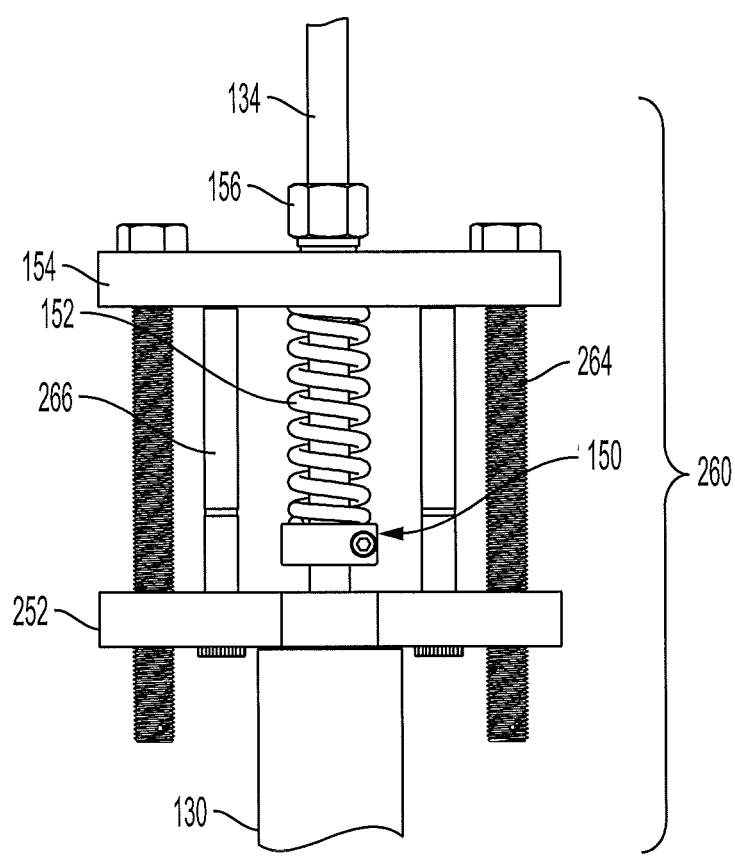
FIG. 23 shows a front schematic view of an example mechanical insertion device 260 in accordance with disclosed embodiments.

FIGS. 22 and 23 show perspective and front schematic views of an example mechanical insertion device 260. Mechanical insertion device 260 may be used for hand insertion of the sensor head 100 to the bottom of flow pipe 170 and to compress the spring 152. Mechanical insertion device 260 may be used to both grip and insert the small diameter stem 134 and also to secure the stem from retracting after insertion. The mechanical insertion device 260 is shown including upper adjustment plate 154, which aids in axially aligning small diameter stem 134. Upper adjustment plate 154 is connected to top seal cap 252 by means of threaded fasteners, e.g. bolts 264 passing through 154 and secured through threads cut in top seal cap 252. Bolts 264, in the alternative may also be other threaded fasteners, for example a combination of threaded rod and wing nuts, or other types of nuts. The alignment of upper adjustment plate 154 can be aided by alignment rods 266, which may also serve as a stop to prevent over insertion.

Figure 25:
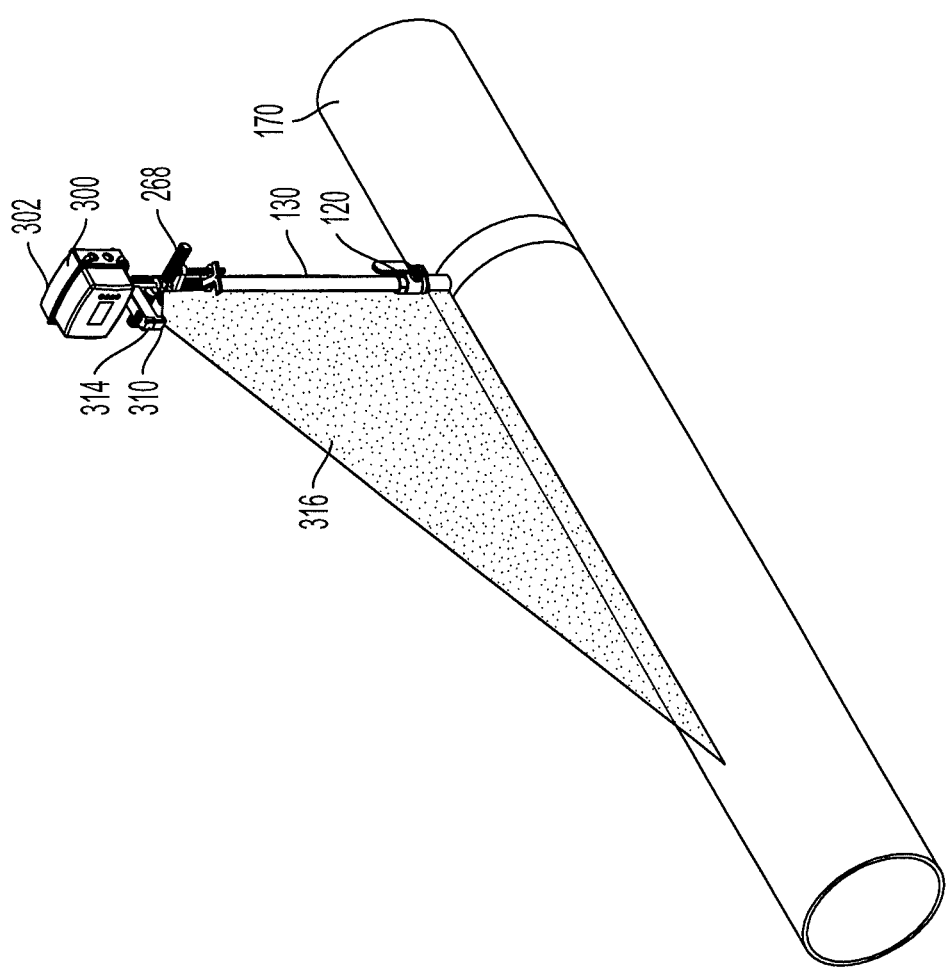
FIG. 25 shows a schematic perspective view of an example controller and line emitting light in accordance with disclosed embodiments.

When tightened, upper adjustment plate 154 exerts a force on spring 152, which in turn exerts a force on collar 150, which is releasable tightened to small diameter stem 134. This results in the stem advancing toward flow pipe 170. When the resilient foot 190 contacts the bottom of flow pipe 170, the spring 152 will compress to prevent damage to sensor head 100 while also applying continued pressure. Once fully secure and aligned nut 156 may be tightened to secure the small diameter stem 134 into position. Nut 156 may be a compression nut and may include compression sleeves as in known in the art. Mechanical insertion device has additional advantages over prior sensor assemblies because the axial movement along axis 114 is independent of rotational movement around axis 114. Thus, if the sensor head 100 does not have proper radial alignment, the stem 134 may be rotated during or after insertion using, for example using handles 268 (FIG. 25). This allows for the proper seal of the mechanically assisted hot 130 independent of the sensor head alignment.

Figure 24:
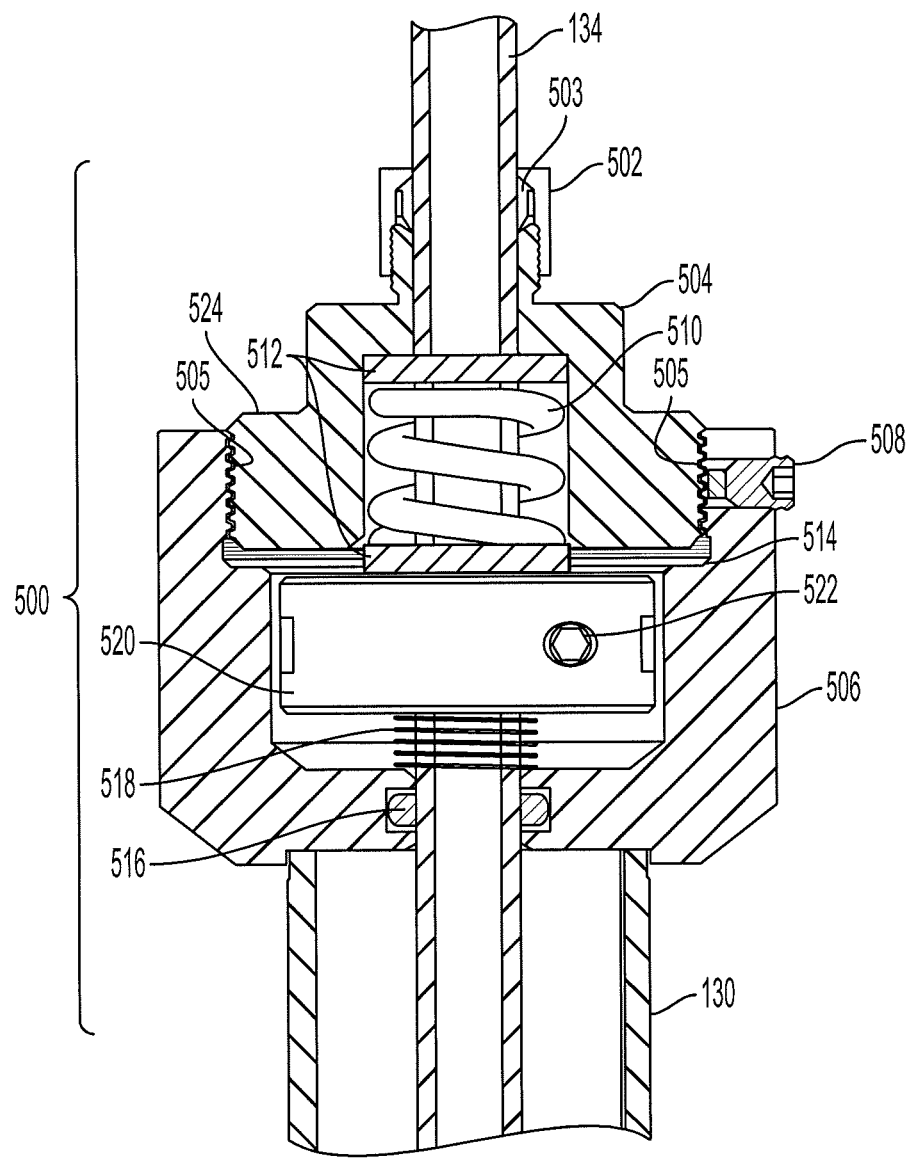
FIG. 24 shows a front schematic view of an example mechanical insertion device in accordance with disclosed embodiments.
Figure 31:
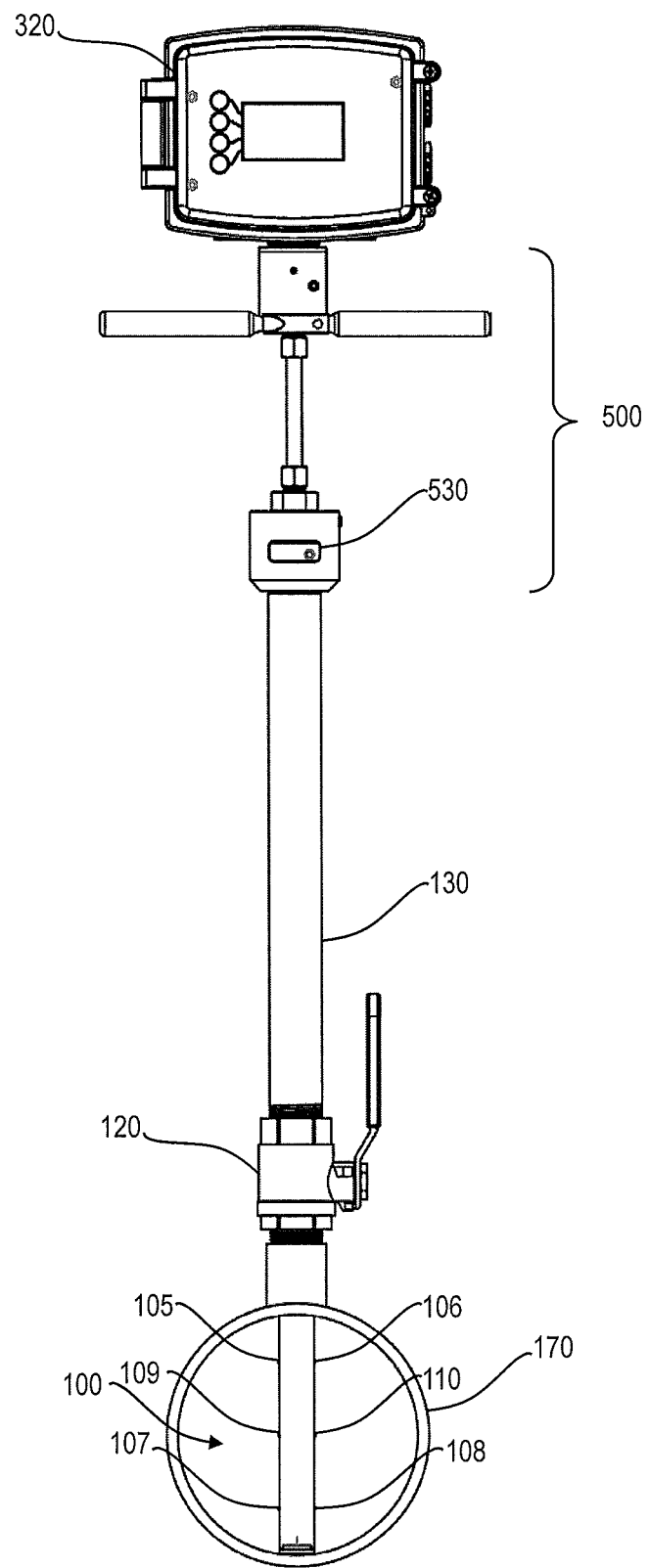
FIG. 31 shows the sensor assembly of FIG. 1 with the mechanical insertion device of FIG. 24 when viewed in the direction of system flow in accordance with disclosed embodiments.

Shown in FIG. 24 is an alternative mechanical insertion device 500 which may take the place of mechanical insertion device 260 in all of the above discussed embodiments, for example as shown in FIG. 31. Referring back to FIG. 24, the mechanical insertion device 500 utilizes a threaded preload nut 504 as a single point of compression/rotation, which in certain conditions may improve maintaining the alignment of the stem 134 perpendicular to the flow pipe 170 (FIG. 1). The preload nut 504 is releasably engaged with the hot tap housing 506, which functions to protect the components internal to the mechanical insertion device 500. The hot tap housing 506 also functions to hold the threads 505 on which preload nut 504 advances or retracts and also functions to provide a hard stop surface 514, which will be discussed below. A preload nut setscrew 508 may provided to prevent movement between the preload nut 504 and the hot tap housing 506. A seal 516 in provided, which may be for example an o-ring, and is similar in design and function as seal 254 (FIG. 17).

Mechanical insertion device 500 includes main spring 510, for example a high tension spring, having a spring constant between about 1000 in/lbs and about 1500 in/lbs, for example about 1375 in/lb. Main spring 510 provides a similar function to spring 152 (FIG. 23). That is, main spring 510, when compressed, applies a consistent pressure downward so the sensor head 100 (FIG. 1) does not shift under high flow conditions or sudden changes in flow. The force of the main spring 510 is dispersed through washers 512. A collar 520, located between the preload nut 504 and the hot tap housing 506, or otherwise within a chamber defined by the same, is releasably connected to the stem 134 and is used to transfer force between the main spring 510 and the stem 134. In one example, as shown, the collar 520 is releasably connected to the stem 134 using a collar screw 522, which tightens the collar 520 around the stem 134. Collar screw 522 may be any suitable fastener such as a hex recess fastener. A positioning spring 518 is included for maintaining the position of the collar 520 while securing collar screw 522. A ferrule 503 and collet nut 502 may be used to secure the stem 134.

Figure 26:
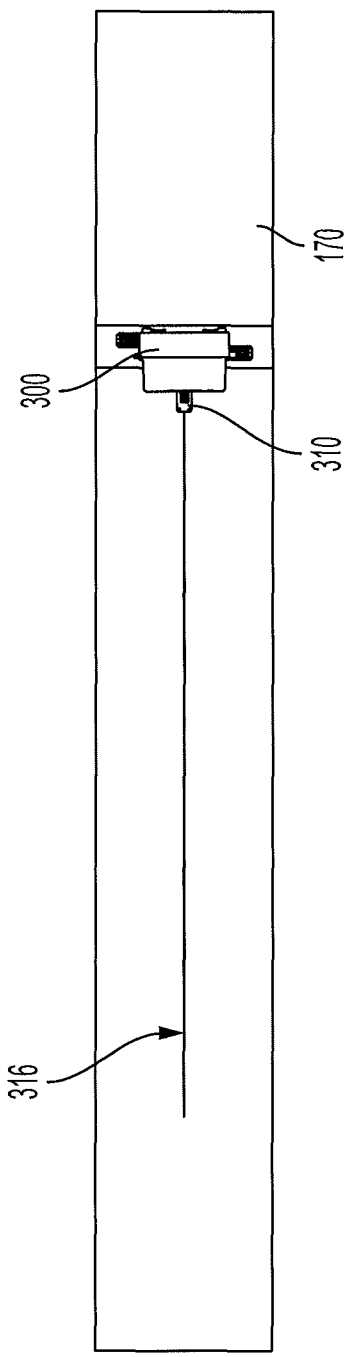
FIG. 26 shows a schematic top view of the FIG. 25 in accordance with disclosed embodiments.
Figure 27:
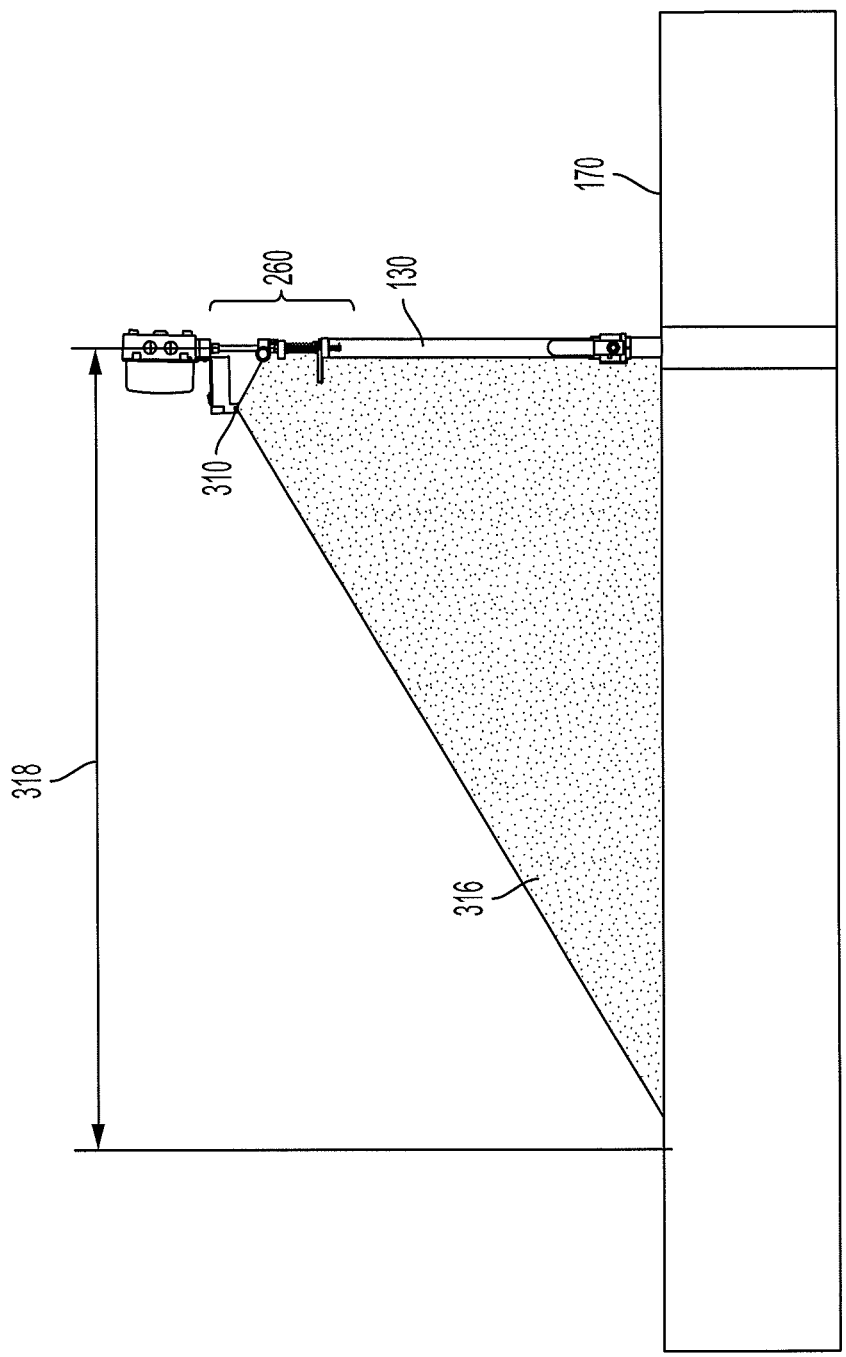
FIG. 27 shows a schematic front view of the FIG. 25 in accordance with disclosed embodiments.

Shown in FIGS. 25-27, rotational alignment about axis 114 is aided by a line emitting light, for example laser 310. Laser 310 is shown held in laser mount 314, which is mounted on small diameter stem 134 and emits a light plane 316 which appears as a line on flow pipe 170 (FIG. 26). The line extends a distance away from axis 114 which allows the installer more accuracy in the axial rotation of stem 134 as compared to a person of ordinary skill in the art who aligns the stem 134 with prior known means. For example, at two feet distance, one degree rotation error equates to about one half inch deflection. Therefore, if the light plane 316 extends as a line about four to five feet away from valve 120, then a one degree rotation error will be even more apparent. The line will, in one example, be several feet long, e.g., 18-36 inches, but will vary depending on the height of the sensor and the specific laser. The longer the line, the more accurate the alignment can be. Small discrepancies in angle will be multiplied by the length of the line to be easily identified and corrected for by turning the small diameter stem until the line is straight. Marking a straight line down the center of the pipe can further improve accuracy. The small diameter stem 134 would then be rotated until the laser line directly overlapped the marked line. This would further guarantee an accurate alignment.

The laser 310 may be powered and controlled by the sensor assembly controller 300 through power and controller wire (not shown) or it may be battery operated and manually controlled. The laser 310 and laser mount 314 may each be rotationally aligned with sensor head 100 prior to installation. In order to aid rotational alignment between sensor head tube 102, large diameter stem 132, small diameter stem 134, laser mount 314, and laser 310, keys, such as flats, notches, or the like, may be machined into each individual component prior to assembly of the sensor assembly. For example, flat 220 (FIG. 15). And in one example, the laser 310 and laser mount 314 are permanently mounted to small diameter stem 134.

A controller 300 is mounted on the top of small diameter stem 134. Each of the wires from sensor head 100 travel up the inside of large diameter stem 132 and small diameter stem 134 and are electrically connected to controller 300 inside of housing 302. Controller 300 may also be adapted to controller other sensor assemblies. In such a configuration, wire assemblies from other sensors assemblies would also enter housing 302. In an alternative embodiment, controller 300 is mounted in another on-site location and wires are connected between small diameter stem 134 and controller 300.

FIG. 28 shows a magnetic field density plot looking down the core 104 such that axis 114 is coming out of the paper. It is noted that darker regions of the plot represent higher magnetic field strengths. In prior sensor designs, electrode wires were shielded from the intense magnetic fields generated by the coils by drilling holes in the center of the core (along axis 114) where the magnetic field is lowest and fishing the wires through the hole. Shielding is advantageous so the magnetic fields do not induce stray current in the electrode wires. However, this practice is expensive to machine and time consuming to install, especially in cores of larger sizes. In the present example embodiment, core 104 has channels 350 machined in the sides not having coils 180 wrapped around them. The channels 350 and core 104 design result in a region of low magnetic field 352. Electrodes wires 112 may instead be run down channels 350 within the region of low magnetic field 352. Spacers 116 (FIG. 7) may be added to help maintain the electrode wires 112 in the region of low magnetic field 352. Producing cores in this matter is less expensive and easier to assemble than prior sensors.

Figure 29A:
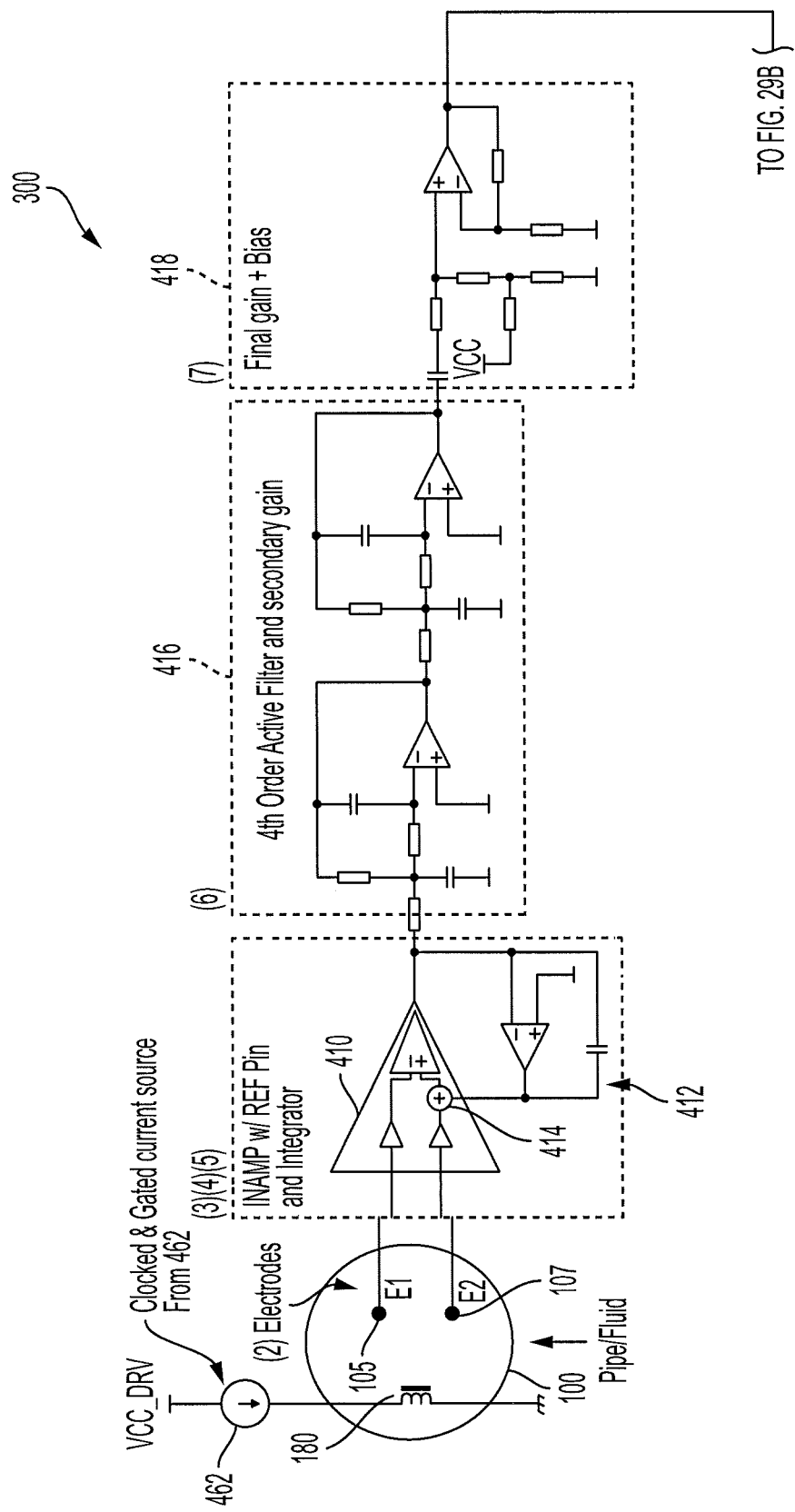
FIGS. 29A and 29B show electrical schematic block diagrams of a controller and sensor head in accordance with disclosed embodiments.
Figure 29B:
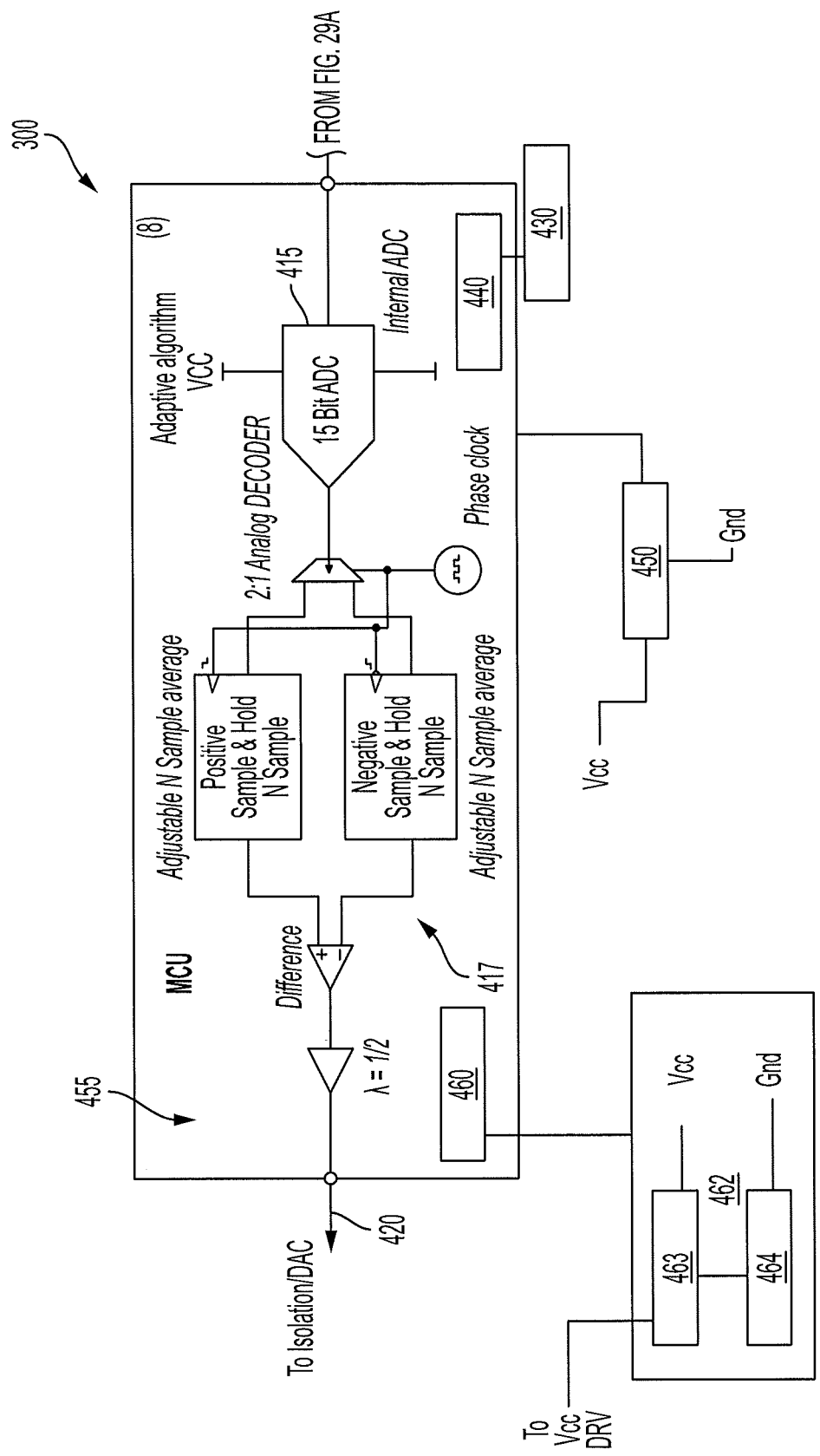

FIGS. 29A and 29B show an electrical schematic of controller 300 and sensor head 100. Power supply (PSU 450) supplies power to the coil drive circuit 462 and to the microcontroller unit (MCU) 455. The MCU 455 includes an output and user interface control and configuration module 440 which is electrically connected to user input output (I/O) 430, which can include, buttons, selector switches, displays, indicators, digital and/or analog interfaces, and alerts. The MCU includes an Oscillator 460 (OSC) which is electrically connected to the coil drive circuit 462. Within coil driver circuit 462 is an H-bridge 463 and current regulator 464 to protect the field coils 180. If additional sensor assemblies are being controlled by controller 300 than additional H-bridges and current regulators may be included if not already present within the selected H-bridge package. The H-bridge 463 energizes field coils 180. The H-bridge 463 alternates the current output at field coils 180 based on the OSC. Using alternating current (AC) prevents permanent magnetization of core 104 and also allows for the minimization of electrochemical and other effect at the electrodes by filtering out DC voltage components, discussed below.

Periodically, an electrical potential (voltage) is read at electrodes 105, 107 and the voltage generated is indicative of the speed at which an electrically conductive fluid (e.g., water) passes through the magnetic field produced by field coils 180 in accordance with Faraday's law. Electrodes 105,107 may either be electrically connected to electrodes 106,108, respectively, or independent. If they are separate, additional input channels may be included in controller 300 up to analog to digital converter (ADC) 415, which can also have a multi-channel multiplexer features. The voltage read at electrodes 105,107 is amplified at amplifier 410.

When configuring the instrumentation amplifier 410 the gain directly influences how much DC error can be removed from an input signal. The gain should be chosen so that the amplifier 410 operates in its linear region but not so high as to reduce the input range to a narrow margin.

Integrator 412 provides negative feedback at 414 to AC couple the signal. The resulting analog signal is then pre-filtered through low pass filter (LPF) 416 for filtering to remove high frequency noise and to provide more gain. Then the signal is sent to BIAS 418 for final gain and appropriate bias to maximize the input resolution for digital processing at ADC 415. The gain and filter stage LPF 416 is designed so that its bandwidth is significantly lower than the bandwidth of the digital filter 417, ensuring that no aliasing of higher frequency signals would hamper the output of the digital filter 417. Further, the gain is adjusted to provide enough amplification to maximize the ADC's input range. In order to avoid "clipping" of the noise spikes, which creates harmonic distortion of the signal, the output of the filter is biased to the half-supply point, before being digitized.

The use of AC through the active circuitry eliminates the need to remove various stray DC potentials, e.g., electrochemical potential at the electrodes. Analog integration of the voltages across the entire pipe diameter rather than manually averaging several small points in the flow, as is done in prior sensors, allows infinite resolution sensing of the induced voltage without requiring weighting of various readings. A single voltage is read by the controller 300 greatly reducing controller and sensor complexity and cost. Example embodiments also offer improved performance after elbows or disturbances which contributes to shorter straight-run requirements. For example, in a straight pipe the velocity profile of the fluid flowing within the pipe is generally parabolic and the average velocity vector is at a depth of about ⅛ the inner diameter. Therefore, prior sensor generally only measure the flow velocity at the ⅛ depth and assume that flow velocity is representative of the velocity at other depth. However, changes in the straightness of the pipe, for example elbows or other connections disrupt the parabolic velocity profile and thus decrease the accuracy of those prior meters (either reading too high or too low depending on where it is in the pipe). In contrast, the example flow sensor of the present application measures the induced voltage across almost the entire inner diameter such that those disruptions are sampled and included in the measurement and thus does not have as stringent pipe straight run requirements. Overall, this reduces the system complexity and increases the measurement accuracy.

The majority of prior known electro-magnetic flow meters use a DC coupled amplifier as the front stage, which results in the need for complex switching circuitry and precision timing techniques to process the input signal. This increases nonlinear behavior and error. Present embodiments use an AC coupled preamplifier allowing for a linear intermediate amplifier and removing the need for complex switching circuitry and precision timing techniques. AC coupling is accomplished through applying negative feedback of an integrated input signal after the instrumentation amplifier's input stage. The negative feedback removes DC offset while still providing high input impedance and high common mode rejection. AC coupling the signal while preserving the common mode rejection and high input impedance required to accurately sense an electro-magnetic flow meter's signal. This AC coupling scheme ensures that the signal leaving the first stage and being pre-filtered (for anti-aliasing) and amplified will have a minimal amount of error contained in the signal, which increases the signal to noise ratio of the overall amplifier.

After amplification the signal is digitally rectified. Rectification and final filtering is accomplished digitally with a custom algorithm designed to provide a very stable output that still responds quickly to input—increasing accuracy and performance and filtered with an adaptive filtering algorithm, resulting in a more linear, precise, and accurate electro-magnetic flow meter. The controller 455 precisely rectify the signal and convert the square wave (produced by the alternating magnetic field) into a DC value that is proportional to flow rate. The controller 455 is configured to "jump" if the input changes providing the benefits of a tight filter (stable output) and a loose filter (faster response). Further the controller 455 auto-zeros itself by looking at two subsequent and opposite coil pulses, thus removing a production and installation step and improving installation efficiency.

Once the signal has been converted from an analog signal to a digital signal at ADC 415, the controller 455 auto zeroes the signal, converts the alternating signal into a DC level proportional to flow rate and applies the final filtering. To accomplish this function, the controller 455 monitors the input and output of the signal and looks for an input change equal to a present percentage. If the input "jumps" the output follows, which in turn increases the responsiveness of the device. That is, the controller 455 looks at two successive pulses, of opposite sign, and uses that information to rectify the signal, heavily filter out the noise, and adapt to large input changes.

The signal is then output by the MCU as a resulting flow velocity or volumetric or mass flow rate depending on the configuration at 420.

Figure 30:
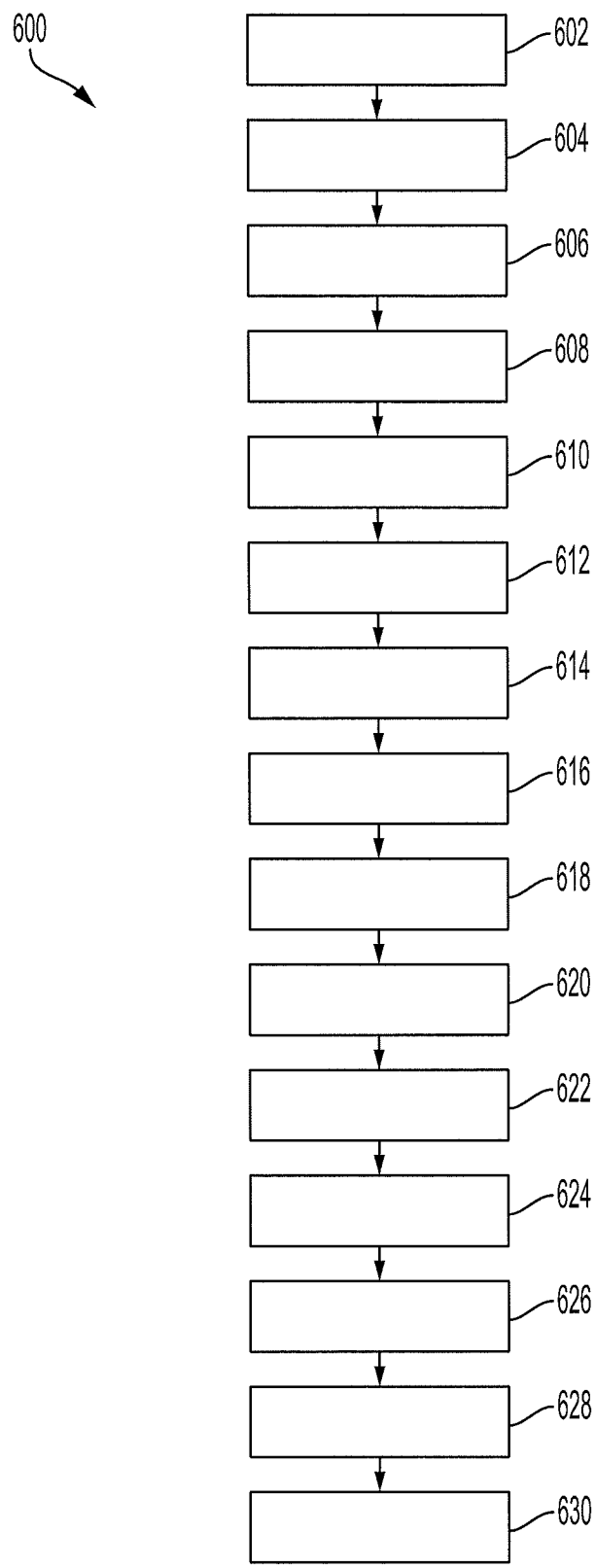
FIG. 30 shows a method in accordance with disclosed embodiments.

With reference to FIG. 30, a method 600 of installing a sensor assembly 101 (FIG. 1) will be discussed that includes mechanical insertion device 500 (FIG. 24). At step 602 a counterclockwise half-turn or more is applied to the collet nut 502, collar screw 522, and set screw 508 to ensure that the stem 134, preload nut 504, and collar 520 can move freely. It should be noted that specific configurations may require more or less turning depending on the thread configuration and thread direction. At step 604 the sensor head 101 is slid a few inches out of the hot tap adapter 130 to make sure it moves freely. If it does not, additional adjustments are made to the collet nut 502 and collar screw 522 to ensure they are not tightened down, then try again. At step 606, the sensor head 101 is retracted fully into the hot tap adapter 130. At step 608, the pipe threads of the hot tap adapter 130 are covered in an appropriate pipe sealant, for example pipe tape. At step 608, keeping the valve 120 closed, the threaded end of the hot tap adapter 130 are inserted into the valve 120 and secured, for example, by turning clockwise with appropriate tools. At step 610, the valve 120 is opened and inspected for leaks at the threaded joint. If there are any leaks, the valve 120 is closed and additional torque to the hot tap adapter 130 is applied and then opened and checked for leaks again.

At step 612, the preload nut 504 is inserted fully by rotating the preload nut 504 all the way clockwise (assuming right handed threads) into the hot tap housing 506. In one configuration, the lip 522 of the preload nut 504 should be flush with the top of the hot tap housing 506 with no threads visible and the preload nut 504 should not turn any further. At step 614, the laser 310 (FIG. 25) is turned on (if included) and the sensor assembly 101 is aligned with the flow pipe 170 with the laser pointing down the center of the pipe in the expected down-stream direction. At step 616, the preload nut 504 is rotated out 1 and ¼ turns counterclockwise and the preload collar is checked to ensure it can move inside the housing. At step 618, using the handles 268 (FIG. 25), the sensor head 100 is inserted slowly into the pipe. At this step if the stem 134 is pushed in, it should bounce gently on its positioning spring. At step 620 an additional check of the laser alignment may be performed with correction if necessary. At step 622, while maintaining downward force on the handles 268, the collar screw 522 is tightened using a fastener accessed through a window 530 (FIG. 31) or opening in hot tap housing 506. If necessary at this step, the collar 520 may need to be rotated inside the hot tap housing 506 to get access to the collar screw 522 head. At step 624, the preload nut 504 is rotated all the way in (clockwise assuming right handed threads) into the hot tap housing 506 until it bottoms out at hard stop 514. This action preloads the main spring 510. The lip 524 of the preload nut 504 should be flush with the top of the housing 506 with no threads visible and the preload nut should not turn any further. At step 626 the collet nut 502 is tightened. While tightening the collet nut 502 alignment should be maintained by counteracting the torque using the handles 268 as an aide. At step 628, the laser 310 is shut off and the set screw 508 on side of the hot tap housing 506 is tightened. At step 630 electrical connections are made to controller 300 (FIG. 29A).

It should be understood that the above description is only illustrative of the invention. Various alternatives and modifications can be devised by those skilled in the art without departing from the invention. Accordingly, the present invention is intended to embrace all such alternatives, modifications and variances which fall with the scope of the appended claims.

What is claimed as new and desired to be protected by Letters Patent of the United States is:

1. A method of inserting a sensor assembly into a flow pipe comprising:
   fastening a preload nut into a hot tap housing;
   applying force to at least one handle connected to a stem to insert the sensor assembly into the flow pipe;
   fastening a collar onto the stem, wherein the collar is between the preload nut and the hot tap housing;
   tightening the preload nut into the hot tap housing until the preload nut bottoms out at a hard stop, wherein tightening the preload nut exerts a force on the collar and the stem in the direction of the flow pipe.

2. The method of claim 1, wherein tightening the preload nut into the hot tap housing until the preload nut bottoms out at a hard stop of the hot tap housing further comprises compressing a main spring, wherein the main spring transfers the force from the preload nut to the collar.

3. The method of claim 1, wherein fastening a collar onto the stem further comprises maintaining the collar in position with a positioning spring.

4. The method of claim 1, wherein the hard stop is a portion of the hot tap housing.

5. The method of claim 1, further comprising tightening a collet nut around the stem.

6. The method of claim 1, further comprising aligning the sensor assembly with the flow pipe using a line emitting light.

7. The method of claim 1, wherein the sensor assembly comprises:
   a sensor head connected to the stem, the sensor head including at least one top electrode and at least one bottom electrode; and
   a field coil configured to emit an alternating magnetic field when energized with an alternating current,
   wherein the at least one top and bottom electrodes are configured to measure a voltage potential of a conductive fluid when the sensor head is inserted into the flow pipe, the flow pipe having an inner circumferential surface.

8. The method of claim 7, wherein the at least one top electrode is proximate to a first portion of the inner circumferential surface of the flow pipe after tightening the preload nut and the at least one bottom electrode is proximate to a second portion of the inner circumferential surface of the flow pipe after tightening the preload nut, and the first and second portions are diametrically opposed.

9. The method of claim 7, wherein the sensor head is affixed to the stem via a threaded connection.

10. The method of claim 7, wherein the sensor head is affixed to the stem and the stem has a large diameter portion and small diameter portion, the large diameter portion being closer to the sensor head than the small diameter portion and the large diameter portion being larger than the small diameter portion.

11. The method of claim 10, wherein the stem includes an anchor fixedly connected to the large diameter portion and the small diameter portion, the anchor having a larger cross-sectional surface area than the small diameter portion across each of their respective longitudinal axis.

12. The method of claim 11, wherein the anchor having a larger cross-sectional surface area than the small diameter portion provides a hydraulic mechanical advantage for a force exerted against the small diameter portion.

13. The method of claim 11, wherein the sensor assembly further comprises a hot tap adapter, and the anchor's outer diameter is smaller than an inner diameter of the hot tap adapter.

14. The method of claim 13, further comprising gaps between the anchor and the hot tap adapter to allow for pressure equalization across the anchor.

15. The method of claim 14, wherein the stem can rotate before, during, and after insertion of the sensor head into the flow pipe and independently of a properly sealed hot tap adapter.

16. The method of claim 14, further comprising emitting a line onto the outside surface of the pipe during and/or after insertion of the sensor assembly into the pipe.

17. The method of claim 13, wherein the anchor is sized to fit tightly within the hot tap adapter to minimize lateral deflection of the sensor head when installed in the flow pipe.

18. The method of claim 7, wherein the sensor head comprises a core and the field coils are wrapped around a first and second sides of the core.

19. The method of claim 18, wherein the core comprises channels along third and fourth sides of the core and the channels are parallel to a central longitudinal axis of the core.

20. The method of claim 19, wherein the sensor head comprises at least one electrode wire within the channels.

21. The method of claim 20, wherein the sensor head comprises at least one spacer in the channel such that the electrode wire is between the spacer and the central longitudinal axis of the core.

22. The method of claim 19, wherein a portion of the channels is in a region of lower magnetic field when the field coils are energized.

23. The method of claim 18, wherein the sensor head is molded and/or over molded over the core and/or electrodes.

24. The method of claim 7, further comprising a mechanical insertion device the mechanical insertion device including a top seal cap, an upper adjustment plate.

25. The method of claim 24, wherein the stem passes through the top seal cap and the upper adjustment plate and the sensor assembly further comprises a spring and a collar each at least partially circumferentially surrounding the stem between the top seal cap and the upper adjustment plate.

26. The method of claim 7, further comprising generating an alternating magnetic field, measuring the voltage across the at least one top and bottom electrodes, and amplifying and filtering a resulting signal.

27. The method of claim 26, further comprising monitoring an input and an output of the resulting signal and looking at two successive pulses, of opposite sign, and using that information to rectify the signal, and filter out the noise.

28. The method of claim 7, further comprising a mechanical insertion device the mechanical insertion device including the preload nut and the hot tap housing.

29. A method of inserting a sensor assembly into a flow pipe comprising:
    fastening a preload nut into a hot tap housing;
    applying force to at least one handle connected to a stem to insert the sensor assembly into the flow pipe;
    fastening a collar onto the stem, wherein the collar is between the preload nut and the hot tap housing;
    tightening the preload nut into the hot tap housing until the preload nut bottoms out at a hard stop;
    wherein fastening a collar onto the stem further comprises maintaining the collar in position with a positioning spring.

30. A method of inserting a sensor assembly into a flow pipe comprising:
    fastening a preload nut into a hot tap housing;
    applying force to at least one handle connected to a stem to insert the sensor assembly into the flow pipe;
    fastening a collar onto the stem, wherein the collar is between the preload nut and the hot tap housing;
    tightening the preload nut into the hot tap housing until the preload nut bottoms out at a hard stop;
    wherein the hard stop is a portion of the hot tap housing.

\* \* \* \* \*